United States Patent [19]
Shirakawa

[11] Patent Number: 5,818,415
[45] Date of Patent: Oct. 6, 1998

[54] GRAPHIC FORM INPUTTING APPARATUS

[75] Inventor: Takahisa Shirakawa, Tokyo, Japan

[73] Assignee: NEC Corporation, Tokyo, Japan

[21] Appl. No.: 672,755

[22] Filed: Jun. 28, 1996

[30] Foreign Application Priority Data

Jun. 30, 1995 [JP] Japan ................................. 7-188019

[51] Int. Cl.6 ....................................................... G09G 5/34
[52] U.S. Cl. ............................................ 345/121; 345/440
[58] Field of Search ................................... 345/121, 133, 345/440; 395/140

[56] References Cited

U.S. PATENT DOCUMENTS 4,267,573  5/1981  Chaikin et al. ........................ 345/121

FOREIGN PATENT DOCUMENTS 64-17156   1/1989   Japan .
3-226797  10/1991   Japan .

OTHER PUBLICATIONS

HavenTree Software Ltd., EasyFlow Reference Manual, pp. 40–43 and 254–259, 1993.

Primary Examiner—Amare Mengistu
Attorney, Agent, or Firm—Foley & Lardner

[57] ABSTRACT

The invention provides a graphic form inputting apparatus wherein an arbitrary one of a plurality of grids defined in advance can be selected suitably and displayed on the screen and the origin, the distances of grid lines of the grid displayed can be changed with reference to another grid. A grid origin movement section displays, when a request to move an origin of an effective grid on a display apparatus by an operator is received, one of the other grids stored in a grid information storage section which is selected by the operator to be displayed on the display apparatus. Then, when coordinate values of a destination of the movement of the origin of the effective grid are inputted by the operator, the grid origin movement section normalizes the inputted coordinate values with the grid displayed on the display apparatus and changes coordinate values of the origin of the effective grid to coordinate values obtained by the normalization. Also a grid line distance changing section and a grid axis inclination angle changing section for changing the grid line distances and the grid axis inclination angle with reference to another grid, respectively, are provided.

8 Claims, 20 Drawing Sheets

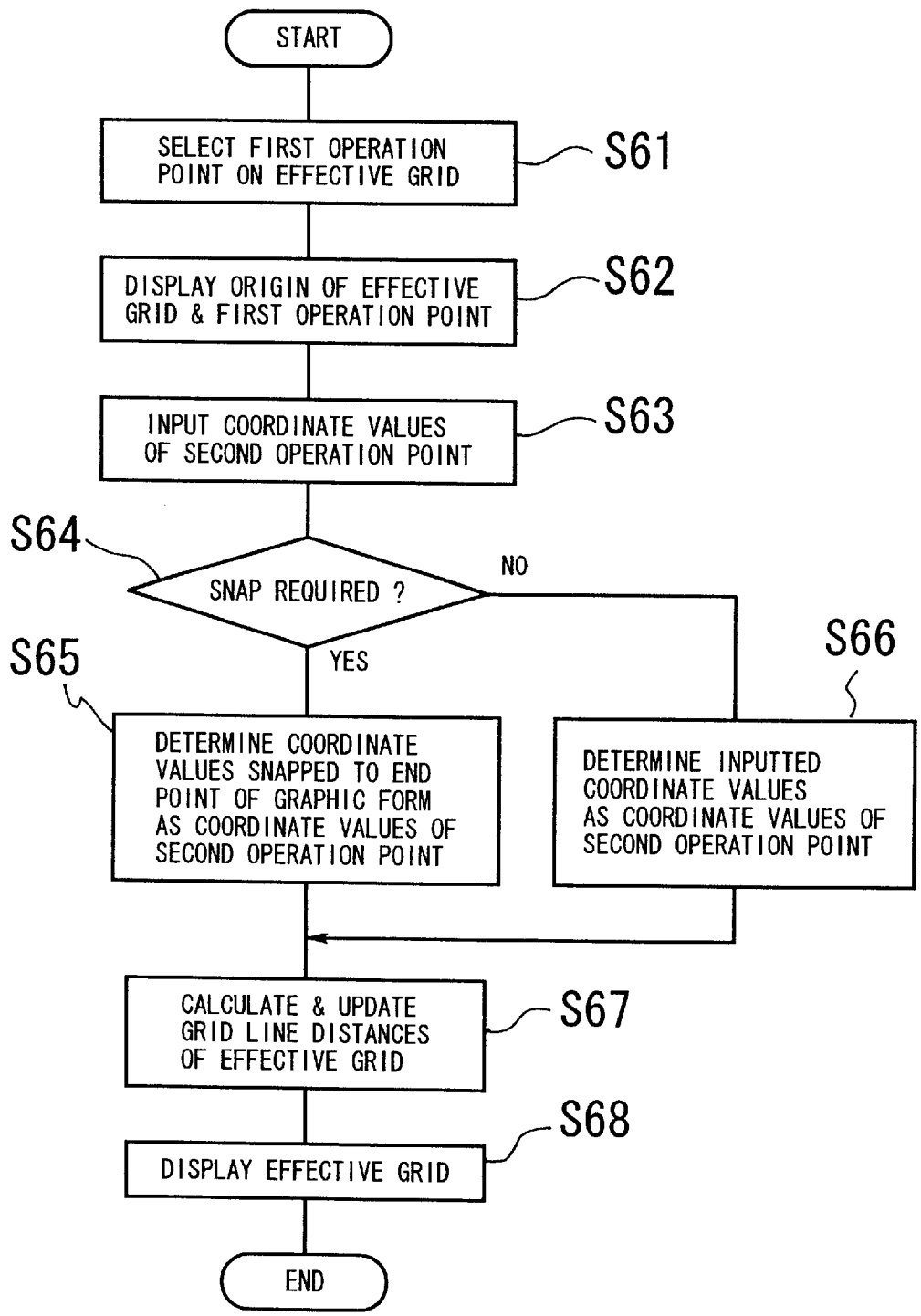

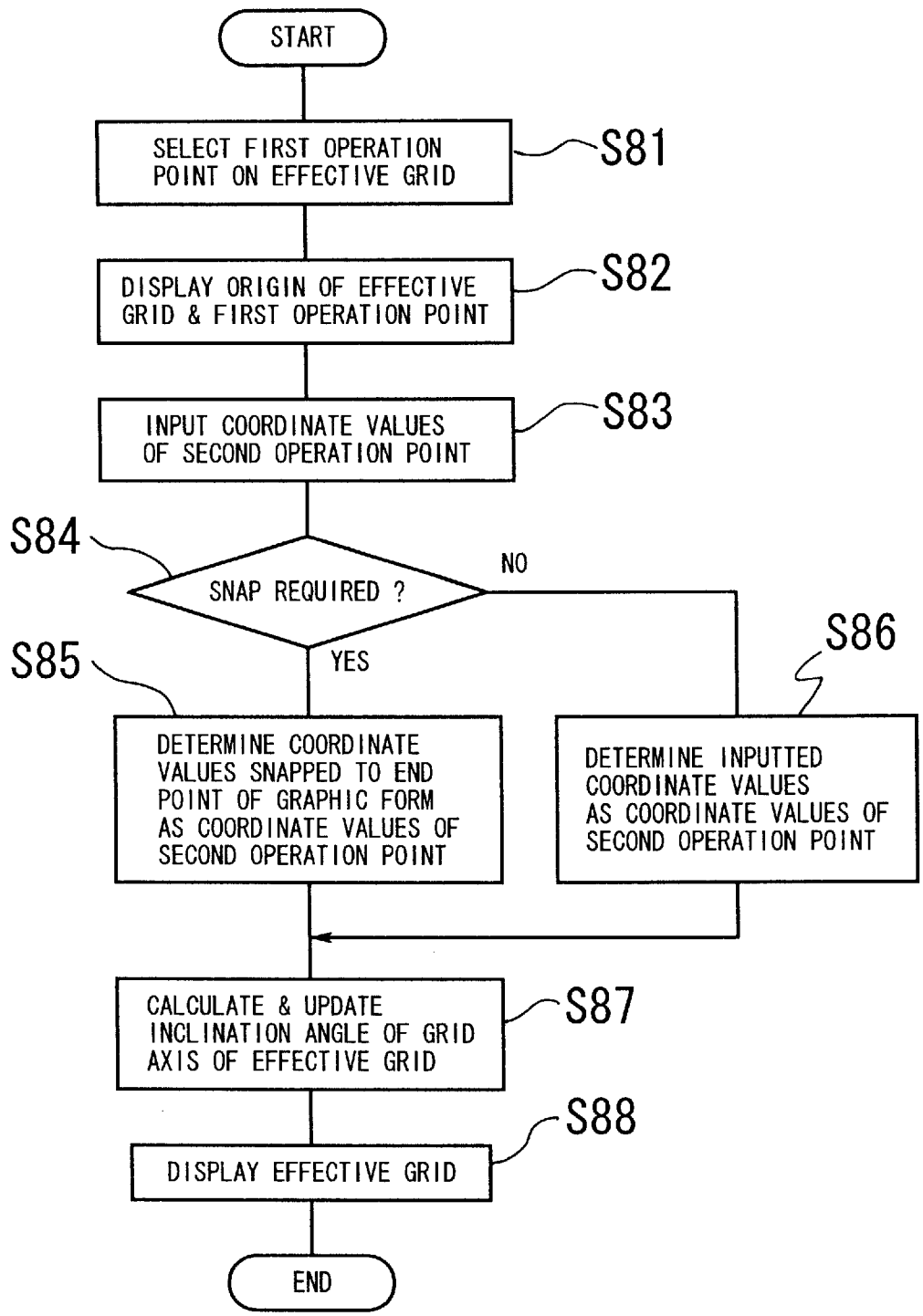

GRAPHIC FORM INPUTTING APPARATUS

BACKGROUND OF THE INVENTION

1. Field of the Invention

This invention relates to a graphic form inputting apparatus, and more particularly to a graphic form inputting apparatus with a grid function by which a grid is displayed on the screen of a display apparatus.

2. Description of the Related Art

Various graphic form inputting apparatus which can be applied to a word processor, a CAD system or a like system are conventionally known, and one of such graphic form inputting apparatus is a graphic form inputting apparatus with a grid function. In the graphic form inputting apparatus with a grid function, in order to allow a graphic form such as a rectangle, a circle or a polygon to be inputted with accurate dimensions, a grating called grid is displayed on the screen of a display apparatus and coordinate values of a point on the screen designated by an operator by means of a pointing device such as a mouse are normalized (snapped) to coordinate values of one of intersecting points of grid lines of the grid which is nearest to the position defined by the coordinate values of the designated point.

A graphic form inputting apparatus with a grid function (hereinafter referred to merely as graphic form inputting apparatus) of the type just described often require a plurality of different types of grids depending upon the type or the shape of a graphic form to be inputted. Therefore, the following graphic form inputting apparatus have been proposed:

First Prior Art:

A graphic form inputting apparatus wherein a plurality of different types of grids are displayed at a time on the screen so that the operator can suitably select one of the grids which is to be used for normalization. This type of graphic form inputting apparatus is disclosed, for example, in Japanese Patent Laid-Open Application No. 64-17156.

Second Prior Art:

Another graphic form inputting apparatus wherein a plurality of different types of grids are defined in advance and one of the grids is suitably selected by an operator and displayed on the screen. This type of graphic form inputting apparatus is described in the description of the prior art in the above-mentioned prior art document.

Third Prior Art:

A graphic form inputting apparatus wherein a single grid is displayed on the screen such that the origin or the distance between grid lines of the grid displayed can be suitably changed by an operator as disclosed in Japanese Patent Laid-Open Application No. Heisei 3-226797. In the third prior art apparatus, before a grid is displayed, designations of an operator designating the distances between grid lines which extend perpendicularly to each other to define square or rectangular shapes or frameworks and the origin of the grid are accepted, and a grid is displayed on the screen in accordance with the designations. The grid line distances can be designated with numerical values by means of ten keys or may be selected from among a plurality of distances set in advance using a sub menu. The origin of the grid is designated by designation of a point on the screen by means of a mouse or a like pointing device. In this instance, when no graphic form is produced on the screen as yet, the thus designated point is determined as the origin, but when some graphic form is produced already on the screen, one of intersecting points or end points of the grid lines which is positioned nearest to the designated point is determined as the origin.

While such various graphic form inputting apparatus wherein production of a graphic form can be proceeded using a plurality of different grids as described above have been proposed, they have such disadvantages as described below.

With the graphic form inputting apparatus of the first prior art, since a plurality of grids are displayed normally in an overlapping relationship with each other at a time on the screen, even if such a countermeasure that the different grids are displayed in different colors is taken, the grids cannot still be visually discerned well. Consequently, the graphic form inputting apparatus is not suitably used to produce a graphic form of a great length similarly as upon production with a fine grid displayed on the screen. The graphic form inputting apparatus is disadvantageous also in that also the processing time required to display grids increases in proportion to the number of different types of grids.

The graphic form inputting apparatus of the second prior art eliminates such disadvantages of the graphic form inputting apparatus of the first prior art since only one grid is displayed on the display screen. However, the graphic form inputting apparatus of the second prior art (also in the graphic form inputting apparatus of the first prior art) is disadvantageous in that, since the positional relationship between a plurality of grids displayed on the display screen are fixed at a point of time when it is defined in advance, it cannot be changed dynamically during production of a graphic form. Consequently, there is another disadvantage in that the graphic form which can be produced using a limited number of grids is limited much in kind, dimension and so forth.

On the other hand, the graphic form inputting apparatus of the third prior art does not have such disadvantages of the graphic form inputting apparatus of the first prior art as described above since only one grid is displayed on the screen. Moreover, the third prior art allows changing of the origin or the grid line distances of the grid during production of a graphic form. However, the graphic form inputting apparatus of the third prior art provides a plurality of different grids to an operator by varying the origin or the grid line distances of the single grid being displayed, but does not prepare a plurality of grids in advance different from the first and second prior art graphic form inputting apparatus. Accordingly, in order to change over the grid being displayed to another grid, an operation of designating the grid or the grid line distances of the grid is required. Consequently, the graphic form inputting apparatus of the third prior art is disadvantageous in that a large amount of operation is required to proceed with production of a graphic form suitably changing over a displayed grid among a plurality of grids.

It is to be noted that it seems a promising idea to apply the function of moving the origin or varying the grid line distances employed in the third prior art apparatus to the apparatus of the second prior art to construct a graphic form inputting apparatus which has a function of moving the origin of any of a plurality of grids prepared in advance to a point of coordinate values or an end point of a graphic form or an intersecting point designated by an operator or varying the grid line distances by an input of numerical values or by menu selection. However, the graphic form inputting apparatus constructed in this manner is not very useful to produce a plurality of graphic forms having some relationship to each other suitably using a plurality of different grids individually since the individual grids can merely be changed independently of each other. This is because, where a plurality of different grids are used individually depending upon the type or the shape of a graphic form to be inputted, it becomes necessary to vary the origin of a grid with reference to another grid. Similarly, also the grid line distances or the inclination angle of a grid axis of a grid may have to be changed with reference to another grid. Further, they may have to be changed with reference to an end point of a graphic form or an arbitrary point.

SUMMARY OF THE INVENTION

It is an object of the present invention to provide a graphic form inputting apparatus wherein an arbitrary one of a plurality of grids defined in advance can be selected suitably and displayed on the screen and the origin of the grid displayed can be dynamically changed with reference to another grid.

It is another object of the present invention to provide a graphic form inputting apparatus wherein the grid line distances of an effective grid can be dynamically changed with reference to another grid or with reference to an end point of a graphic form or else a point of arbitrary coordinate values without relying upon such a method as designation of a numerical value or selection from a sub menu.

It is a further object of the present invention to provide a graphic form inputting apparatus wherein the inclination of a grid axis of an effective grid can be dynamically changed with reference to another grid or with reference to an end point of a graphic form or else with reference to a point of arbitrary coordinate values.

In order to attain the objects described above, the present invention is applied to a graphic form inputting apparatus of the type wherein one of a plurality of grids defined in advance which is selected to input or edit a graphic form by an operator is displayed as an effective grid on a screen of a display apparatus and coordinate values on the screen inputted by the operator are normalized with the effective grid. According to an aspect of the present invention, the graphic form inputting apparatus of the type described above comprises grid information storage means for storing grid information of individual attributes of the grids, and grid origin movement means for causing, when a request to move an origin of the effective grid by the operator is received, one of the other grids stored in the grid information storage means which is selected by the operator to be displayed on the screen of the display apparatus, normalizing, when coordinate values of a destination of the movement of the origin of the effective grid are inputted by the operator, the inputted coordinate values with the grid displayed on the screen of the display apparatus and changing coordinate values of the origin of the effective grid to coordinate values obtained by the normalization.

In the graphic form inputting apparatus, the grid origin movement means causes, when a request to move an origin of the effective grid by the operator is received, one of the other grids stored in the grid information storage means which is selected by the operator to be displayed on the screen of the display apparatus. Then, when coordinate values of a destination of the movement of the origin of the effective grid are inputted by the operator, the grid origin movement means normalizes the inputted coordinate values with the grid displayed on the screen of the display apparatus, and changes coordinate values of the origin of the effective grid to coordinate values obtained by the normalization. Consequently, the origin of the effective grid can be moved to an arbitrary grid point with reference to another grid.

According to another aspect of the present invention, the graphic form inputting apparatus of the type described above comprises grid information storage means for storing grid information of individual attributes of the grids, and grid origin movement means for causing coordinate values of origins of two arbitrary ones of the grids stored in the grid information storage means to coincide with each other at an arbitrary timing. Preferably, the grid origin movement means operates at a timing of changing over of the effective grid to make the coordinate values of the origin of one of the two grids, which is to be rendered effective newly, to coincide with the coordinate values of the origin of the other grid which has been effective till then. Preferably, the graphic form inputting apparatus further comprises second grid origin movement means for changing, when normalization of inputted coordinate values to the effective grid is performed in a graphic form inputting or editing operation, the coordinate values of the origin of the effective grid to coordinate values obtained by the normalization.

In the graphic form inputting apparatus, the grid origin movement means causes coordinate values of origins of two arbitrary ones of the grids stored in the grid information storage means to coincide with each other at an arbitrary timing. Consequently, when a plurality of grids defined in the grid information storage means such that the origins of the grids are different from each other are actually used, the origins of them can be adjusted to each other to a common origin. Where the graphic form inputting apparatus further comprises the second grid origin movement means, each time normalization of inputted coordinate values to the effective grid is performed in a graphic form inputting or editing operation, the second grid origin movement means changes the coordinate values of the origin of the effective grid to coordinate values obtained by the normalization. Where the grid origin movement means operates at a timing of changing over of the effective grid, it makes the coordinate values of the origin of one of the two grids, which is to be rendered effective newly, to coincide with the coordinate values of the origin of the other grid which has been effective till then. Consequently, upon changing over between two grids, the origin of the new effective grid can be automatically changed to the final operation position (final snap position) of the old grid which has been effective till then.

According to a further aspect of the present invention, the graphic form inputting apparatus of the type described above comprises grid information storage means for storing grid information of individual attributes of the grids, and grid line distance changing means for changing, when a request to change distances between grid lines by an operator is received designating an arbitrary grid point on the effective grid as a first operation point and designating an arbitrary grid point of another one of the grids, an end portion of a graphic form or an arbitrary point as a second operation point, the distances between the grid lines of the effective grid so that the first operation point may correspond to the second operation point while the origin of the effective grid is left fixed as a reference.

In the graphic form inputting apparatus, the grid line distance changing means changes, when a request to change distances between grid lines by an operator is received designating an arbitrary grid point on the effective grid as a first operation point and designating an arbitrary grid point of another one of the grids, an end portion of a graphic form or an arbitrary point as a second operation point, the distances between the grid lines of the effective grid so that the first operation point may correspond to the second operation point while the origin of the effective grid is left fixed as a reference. Consequently, the grid line distances of an effective grid can be changed dynamically with reference to another grid or an end point of a graphic form or else a position of arbitrary coordinate values without depending upon such a method as designation of numerical values or selection from a sub menu.

According to a still further aspect of the present invention, the graphic form inputting apparatus of the type described above comprises grid information storage means for storing grid information of individual attributes of the grids, and grid axis inclination angle changing means for changing, when a request to change distances between grid lines by an operator is received designating an arbitrary grid point on the effective grid as a first operation point and designating an arbitrary grid point of another one of the grids, an end portion of a graphic form or an arbitrary point as a second operation point, an inclination angle of a grid axis of the effective grid so that the first operation point may correspond to the second operation point while the origin of the effective grid is left fixed as a reference.

In the graphic form inputting apparatus, the grid axis inclination angle changing means changes, when a request to change distances between grid lines by an operator is received designating an arbitrary grid point on the effective grid as a first operation point and designating an arbitrary grid point of another one of the grids, an end portion of a graphic form or an arbitrary point as a second operation point, an inclination angle of a grid axis of the effective grid so that the first operation point may correspond to the second operation point while the origin of the effective grid is left fixed as a reference. Consequently, the inclination of a grid axis of an effective grid can be dynamically changed with reference to another grid or an end point of a graphic form or else a position of arbitrary coordinate values.

In summary, according to the present invention, there is provided a graphic form inputting apparatus of the type wherein an arbitrary one of a plurality of grids defined in advance can be suitably selected and displayed on a screen of a display apparatus, which is improved in that a component of a grid such the origin, a grid line distance or an axis rotational angle can be dynamically changed with reference to another grid or the like.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 17 is a flow chart illustrating an example of processing for changing the grid line distances with reference to an end point of a graphic form or a point of arbitrary coordinate values by the grid line distance changing section shown in FIG. 1;

FIG. 20 is a flow chart illustrating an example of processing for changing the inclination angle of a grid axis of a grid with respect to an end point of a graphic form or a point of arbitrary values by the grid axis inclination angle changing section shown in FIG. 1.

DESCRIPTION OF THE PREFERRED EMBODIMENT

Figure 1:
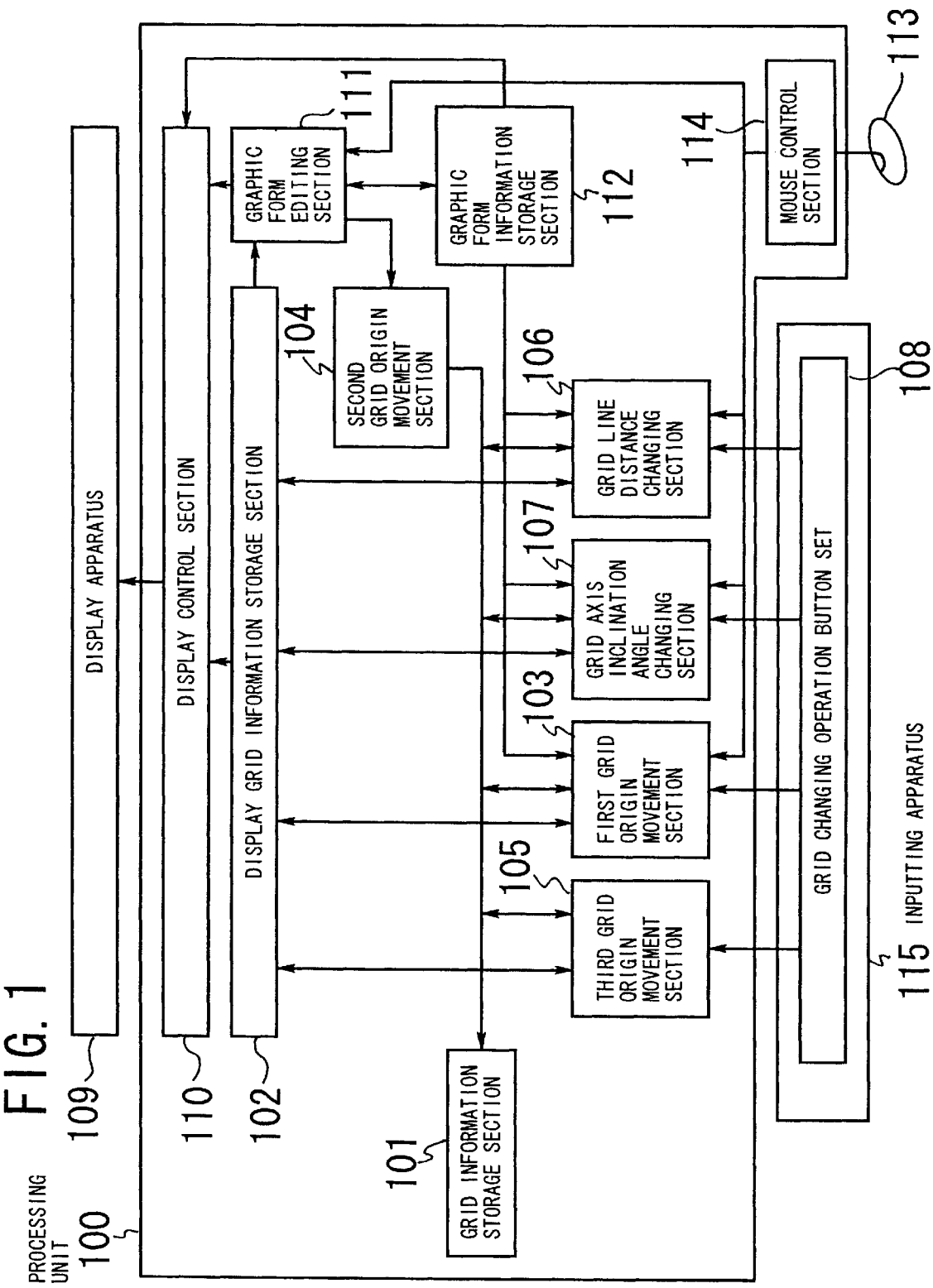
FIG. 1 is a block diagram of a graphic form inputting apparatus showing a preferred embodiment of the present invention.

Referring first to FIG. 1, there is shown a graphic form inputting apparatus to which the present invention is applied. The graphic form inputting apparatus shown includes a display apparatus 109 which may be a CRT display unit or a like apparatus, an inputting apparatus 115 which may be a keyboard or a like apparatus, a mouse 113, and a processing unit 100. Though not particularly shown, the processing unit 100 includes a memory such as a RAM for storing various programs, data and other necessary information and a CPU (central processing unit) for executing the programs. A grid information storage section 101, a display grid information storage section 102 and a graphic form information storage section 112 are constructed in the memory. Further, as functioning sections realized by the programs, the processing unit 100 includes a first grid origin movement section 103, a second grid origin movement section 104, a third grid origin movement section 105, a grid line distance changing section 106, a grid axis inclination angle changing section 107, a display control section 110, a graphic form editing section 111 and a mouse control section 114. Meanwhile, a grid changing operation button set 108 is provided on the inputting apparatus 115.

Figure 2A:
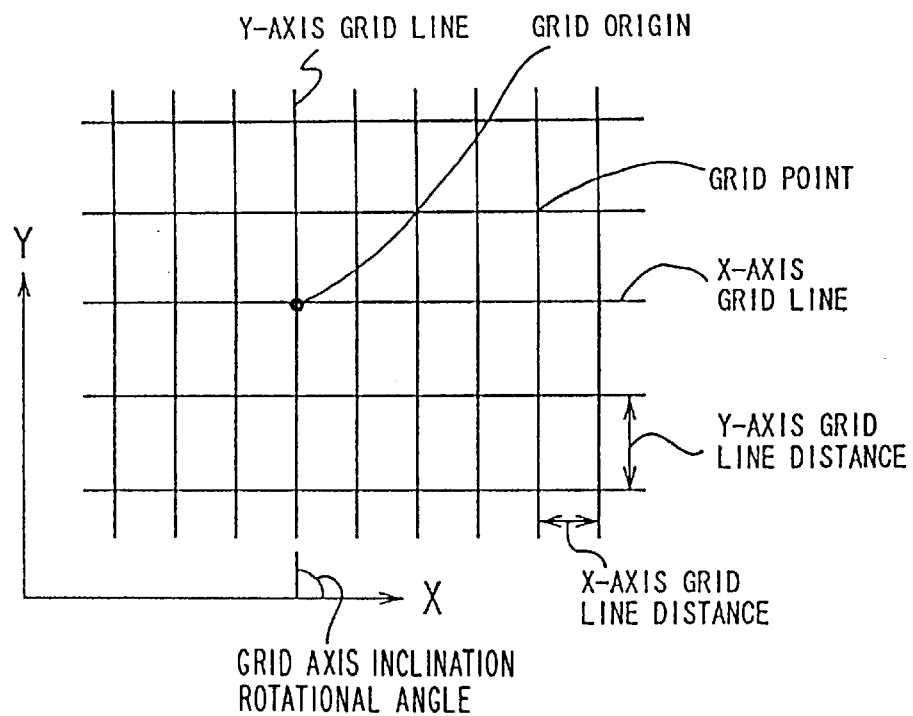
FIGS. 2(a) and 2(b) are diagrammatic views showing a grid of the rectangular coordinate system type and a grid of the polar coordinate system type, respectively.

Generally, as different types of grids, there are grids of the orthogonal coordinate system type and grids of the polar coordinate system type. A grid of the orthogonal coordinate system type includes X-axis grid lines and Y-axis grid lines expending perpendicularly to each other and defining grid points provided by intersecting points therebetween as seen in FIG. 2(a). It is to be noted that a particular one of the grid points serves as the grid origin, and the position of the grid origin is given by coordinate values on a reference XY coordinate system set, for example, on the screen of the display apparatus 109. Further, the distances between adjacent Y-axis grid lines are called "X-axis grid line distances" and all equal to each other, and the distances between adjacent X-axis grids are called "Y-axis grid line distances" and all equal to each other. Further, the angle defined by the Y-axis grid lines and the X-axis of the XY coordinate system is called "grid axis inclination rotational angle" or "grid axis inclination angle".

Figure 2B:
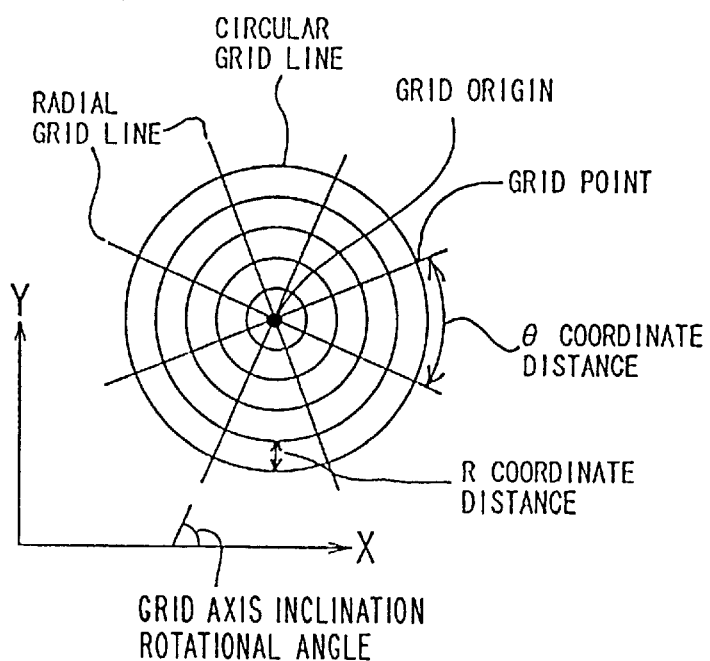

On the other hand, a grid of the polar coordinate system type includes radially extending radial grid lines and concentrical circular grid lines, which define grid points provided by intersecting points therebetween as seen in FIG. 2(b). The origin of the grid is the center of the concentrical circles, and the position of it is represented by coordinate values on a reference XY coordinate system similarly as in a grid of the orthogonal coordinate system type. Further, the angles between adjacent radial grid lines are called "θ coordinate distances" and all equal to each other, and the distances adjacent circular grid lines are called "R coordinate distances" and all equal to each other. Further, the angle between a particular radial grid line and the X-axis of the XY coordinate system is called "grid axis inclination rotational angle" or "grid axis inclination angle".

Figure 3:
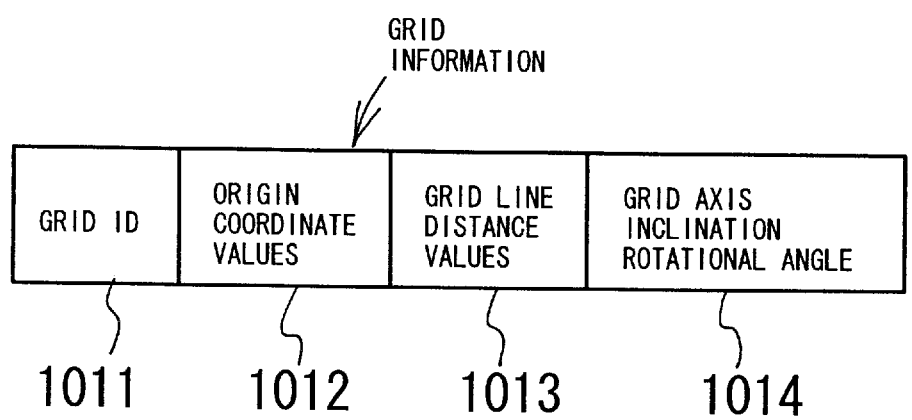
FIG. 3 is a diagrammatic view illustrating an example of a construction of grid information stored in a grid information storage section shown in FIG. 1.

The grid information storage section 101 of the processing unit 100 shown in FIG. 1 stores in advance information of a plurality of different types of grids of both of the orthogonal coordinate system type and the polar coordinate system type described above. FIG. 3 illustrates an example of a construction of information of a grid stored in the grid information storage section 101. Referring to FIG. 3, the information of a grid includes an grid ID (identification number) 1011, origin coordinate values 1012, grid line distance values 1013 and a grid axis inclination rotational angle 1014. The grid line distance values 1013 include, for a grid of the orthogonal coordinate system type, the X-axis grid distance and the Y-axis grid distance described hereinabove with reference to FIG. 2(a), but for a grid of the polar coordinate system type, the R coordinate distance and the θ coordinate distance described hereinabove with reference to FIG. 2(b).

In order to produce a graphic form on the screen of the display apparatus 109, an operator will select an arbitrary one of the plurality of grids stored in advance in the grid information storage section 101 so as to be displayed on the screen of the display apparatus 109 and then manually operate the mouse 113 to successively input various graphic figures. Further, when the operator wants to input or edit a graphic form, the operator will suitably change the origin, a grid distance and/or a grid axis inclination rotational angle of a grid displayed then, that is, an effective grid, to proceed with an operation of producing a graphic form. In order to support such selection, display, change and so forth of a grid, the grid changing operation button set 108, display grid information storage section 102, first grid origin movement section 103, second grid origin movement section 104, third grid origin movement section 105, grid line distance changing section 106, grid axis inclination angle changing section 107 and display control section 110 are provided. Meanwhile, in order to support production of a graphic form by inputting of coordinate values, the mouse control section 114, graphic form editing section 111, graphic form information storage section 112 and display control section 110 are provided. Those elements have the following functions.

The grid changing operation button set 108 includes a plurality of buttons for being manually operated by an operator in order to select or change a grid. The grid changing operation button set 108 may be such a group of buttons as shown, for example, in FIG. 4.

Figure 4:
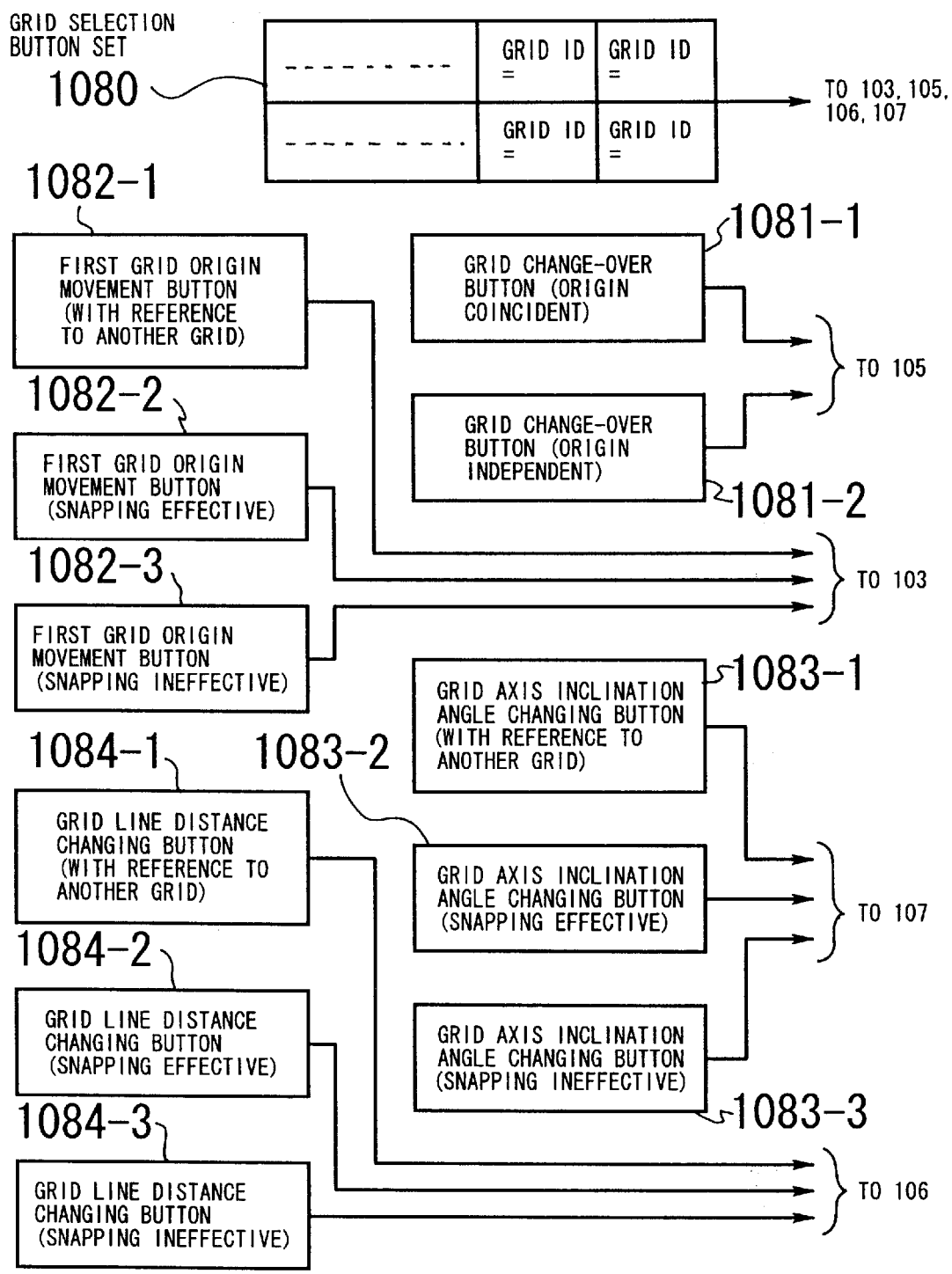
FIG. 4 is a block diagram showing an example of a construction of a grid changing operation button set employed in the graphic form inputting apparatus of FIG. 1.

Referring to FIG. 4, the grid changing operation button set 108 includes a grid selection button set 1080 including a plurality of buttons provided in a one-by-one corresponding relationship to the grids stored in the grid information storage section 101 and each having a corresponding grid ID indicated on a surface thereof.

The grid changing operation button set 108 further includes a pair of grid change-over buttons 1081-1 and 1081-2. The grid change-over button 1081-1 is used to automatically adjust the origin of a grid after a change-over to the origin of another grid before the change-over. The other grid change-over button 1081-2 is used to leave the position of a grid after a change-over at the position of the coordinate values stored in the grid information storage section 101.

The grid changing operation button set 108 further includes first grid origin movement buttons 1082-1 to 1082-3 for being used to move the origin of an effective grid. The button 1082-1 is used to move the origin of an effective grid with reference to another grid; the button 1082-2 is used to move the origin with reference to an end point of a graphic form being produced; and the button 1082-3 is used to move the origin to a position of arbitrary coordinate values.

The grid changing operation button set 108 further includes grid axis inclination angle changing buttons 1083-1 to 1083-3 for being used to vary the inclination angle of a grid axis of an effective grid. The button 1083-1 is used to vary the inclination angle of a grid axis of an effective grid with reference to another grid; the button 1083-2 is used to vary the inclination angle of a grid axis with reference to an end point of a graphic form being produced; and the button 1083-3 is used to vary the inclination angle of a grid axis with reference to a position of arbitrary coordinate values.

The grid changing operation button set 108 further includes grid line distance changing button 1084-1 to 1084-3 for being used to vary the grid line distance of an effective grid. The button 1084-1 is used to vary the grid line distance of an effective grid with reference to another grid; the button 1084-2 is used to vary the grid line distance with reference to an end point of a graphic form being produced; and the button 1084-3 is used to vary the grid line distance with reference to a position of arbitrary coordinate values.

It is to be noted that, while, in the present embodiment, such a grid changing operation button set 108 as shown in FIG. 4 is provided on the inputting apparatus 115 in order to allow an operator to input an instruction of selection or change of a grid to the processing unit 100, the graphic form inputting apparatus of the present invention is not limited to that of the specific construction and may have some other construction. For example, the buttons may be displayed as icons on the screen of the display apparatus 109 so that one of them may be selected by means of the mouse 113. Or, naturally the kinds of the buttons are not limited to those shown in FIG. 4.

Figure 5:
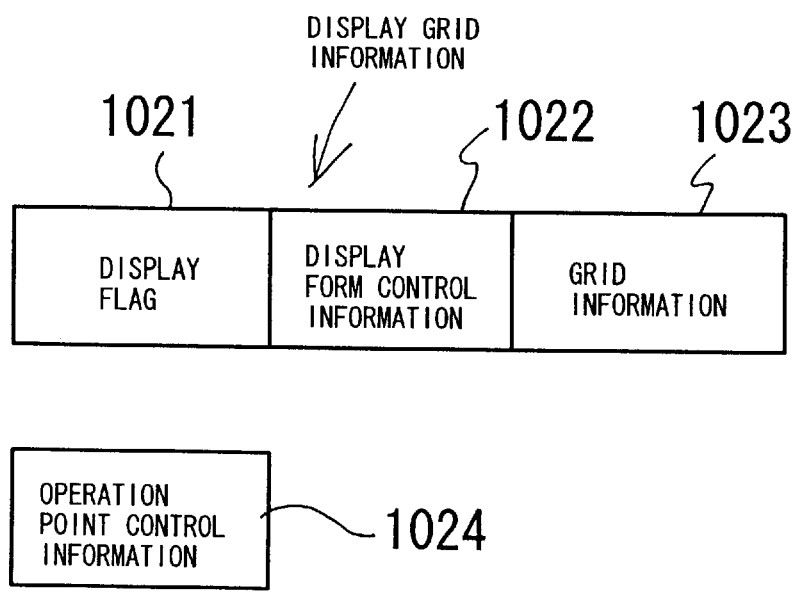
FIG. 5 is a diagrammatic view illustrating an example of a construction of grid information stored in a display grid information storage section shown in FIG. 1.

The display grid information storage section 102 serves as means for storing information of a grid to be displayed on the screen of the display apparatus 109. Referring to FIG. 5, the display grid information storage section 102 stores, for a grid, a display flag 1021, display form control information 1022 and grid information 1023. The display grid information storage section 102 also stores operation point control information 1024 for (a) controlling whether an operation point is effective or ineffective, e.g., whether at an operation point the grid axis inclination angle or the grid line distance is effective or ineffective, and (b) controlling display coordinate values of the operation point. The grid information 1023 is identical with the grid information (FIG. 3) stored in the grid information storage section 101. The display flag 1021 represents whether or not the grid is to be actually displayed on the display apparatus 109. Meanwhile, the display form control information 1022 defines in which one of forms given below the grid is to be displayed:

(1) All grid points and grid axes are displayed and, if the operation point control information 1024 is effective, also the operation point is displayed (hereinafter referred to full display form);

(2) Only the origin of the grid is displayed (hereinafter referred to as origin display form); and (3) Only the origin of the grid and the operation point are displayed (hereinafter referred to as origin and operation point display form).

It is to be noted that the grid information 1023 of the display grid information storage section 102 may store not the information illustrated in FIG. 3 but an address of the grid information storage section 101 in which the grid information is stored.

The mouse control section 114 serves as means for controlling the mouse 113. Mouse control section 114 also detects and supplies to the pertaining components a coordinate position of a mouse cursor, a depression condition of a mouse button and so forth.

The graphic form editing section 111 serves as means for producing a new graphic form on the screen of the display apparatus 109 or modifying a graphic form already produced in response to a graphic form editing operation by an operator by means of the mouse 113, and 113. Graphic form editing section 111 has a function of normalizing coordinate values inputted by the operator to a grid point of an effective grid. For example, if production of a rectangle is selected by a key inputting operation of the inputting apparatus 115 and then coordinate values of the left bottom end point of the rectangle are indicated by the mouse cursor of the mouse 113, the graphic form editing section 111 refers to information of an effective grid currently displayed on the screen of the display apparatus 109 from the display grid information storage section 102 to normalize the coordinate values indicated by the mouse cursor to a grid point in the proximity of the point of the coordinate values, normalizes, after coordinate values of the right top end point of the rectangle are subsequently indicated by the mouse cursor of the mouse 113, the coordinate values to a grid point in the proximity of the point of the coordinate values similarly, produces graphic form information of the rectangle defined by the two end points and stores the graphic form information into the graphic form information storage section 112. The graphic form editing section 111 further has functions of erasing a graphic form stored already in the graphic form information storage section 112, outputting various messages to the operator and so forth.

The graphic form information storage section 112 serves as means for storing graphic form information produced by the graphic form editing section 111. Graphic form information stored in the graphic form information storage section 112 is read out by the display control section 110 so as to be displayed, but upon changing of a grid construction, it is referred to suitably by the first grid origin movement section 103, grid axis inclination angle changing section 107 and grid line distance changing section 106.

The display control section 110 displays a grid on the screen of the display apparatus 109 and displays a graphic form on the display apparatus 109 in accordance with graphic form information stored in the graphic form information storage section 112. Further, the display control section 110 displays a message or the like received from the graphic form editing section 111 on the display apparatus 109. A display of a grid is based on display grid information of FIG. 5 stored in the display grid information storage section 102. In particular, if information of a display grid whose display flag 1021 is "ON" is present in the display grid information storage section 102, then the grid is displayed in a display form set in the display form control information 1022. Further, even if information of a display grid is present in the display grid information storage section 102, if the display flag 1021 is "OFF", then the grid is not displayed. Further, if the display form control information 1022 or the grid information 1023 of a grid being displayed is changed, then the display of the grid is changed rapidly in accordance with the display form control information 1022 or the grid information 1023 after the change.

The first grid origin movement section 103 serves as means for moving the origin of an effective grid displayed on the display apparatus 109 in response to an origin moving operation by an operator. In the present embodiment, the origin of an effective grid can be moved with reference to another grid, or with reference to an end point of a graphic form or to a position of arbitrary coordinate values. Control of the movement of the origin with reference to another grid is started when the first grid origin movement button 1082-1 of FIG. 4 is depressed; control of the movement of the original with reference to an end point of a graphic form is started when the button 1082-2 is depressed; and control of the movement of the origin to a position of arbitrary coordinate values is started when the button 1082-3 is depressed.

The second grid origin movement section 104 serves as means for automatically changing, when normalization of inputted coordinate values to an effective grid is performed by the graphic form editing section 111 in a graphic form inputting or editing operation, coordinate values of the origin of the effective grid to normalized coordinate values of them.

The third grid origin movement section 105 serves as means for adjusting the origins of a plurality of grids. The adjustment processing of the origins is, in the present embodiment, performed at a timing at which an effective grid is changed over to another grid. Also processing of changing over a grid without involving adjustment processing of the origins is performed by the third grid origin movement section 105. In particular, if the grid change-over button 1081-1 of FIG. 4 is depressed, then an effective grid currently displayed on the display apparatus 109 is changed over to another grid selected by the grid selection button set 1080, and the origin of the grid after the change-over is adjusted so as to coincide with the origin of the effective grid just before the change-over. On the other hand, when the grid change-over button 1081-2 of FIG. 4 is depressed, the origin adjustment processing is not performed, but the effective grid currently displayed on the display apparatus 109 is merely changed over to another grid selected by the grid selection button set 1080.

It is to be noted that, while, in the present embodiment, the origin adjustment processing is executed at a timing of changing over of a grid, the origin adjustment processing may alternatively be executed at another arbitrary timing.

The grid line distance changing section 106 serves as means for changing the grid line distance of an effective grid displayed on the display apparatus 109 in response to a grid line distance changing operation by an operator. In the present embodiment, the grid line distance of an effective grid can be changed with reference to another grid or with an end point of a graphic form or else with reference to a position of arbitrary coordinate values. Control of the grid line distance changing with reference to another grid is started when the grid line distance changing button 1084-1 is depressed; control of the grid line distance changing with reference to an end point of a graphic form is started when the button 1084-2 is depressed; and control of the grid line distance changing with reference to a position of arbitrary coordinate values is started when the button 1084-3 is depressed.

The grid axis inclination angle changing section 107 serves as means for changing the inclination angle of a grid axis of an effective grid displayed on the display apparatus 109 in response to a grid axis inclination angle changing operation by an operator. In the present embodiment, the grid axis inclination angle of an effective grid can be changed with reference to another grid or with reference to an end point of a graphic form or else with reference to a position of arbitrary coordinate values. Control of the grid axis inclination angle changing with reference to another grid is started when the grid axis inclination angle changing button 1083-1 of FIG. 4 is depressed; control of the grid axis inclination angle changing with reference to an end point of a graphic form is started when the button 1083-2 is depressed; and control of the grid axis inclination angle changing with reference to a position of arbitrary coordinate values is started when the button 1083-3 is depressed.

Subsequently, operation of the graphic form inputting apparatus of the present embodiment having the construction described above will be described specifically in connection with a change-over of a grid.

1) Movement of the origin by the first grid origin movement section 103

When an operator wants to move the grid origin of an effective grid displayed on the display apparatus 109 in order to perform inputting or editing of a graphic form, if the grid origin should be moved with reference to another grid, the operator will depress the button 1082-1 of FIG. 4 of the grid changing operation button set 108; if the grid origin should be moved with reference to an end point of a graphic form produced, the operator will depress the button 1082-2; but if the grid origin should be moved to a position of arbitrary coordinate values, the operator will depress the button 1082-3.

1-1) Operation when the button 1082-1 is depressed

Figure 6:
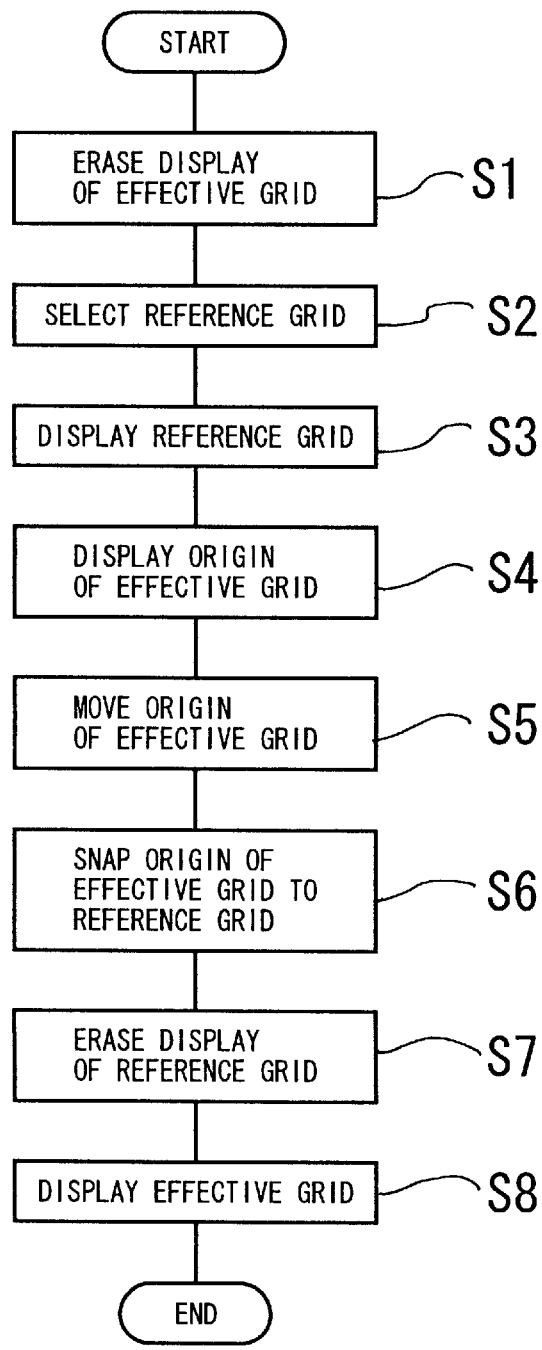
FIG. 6 is a flow chart illustrating an example of processing for movement of the origin with reference to another grid by a first grid origin movement section shown in FIG. 1.

If the button 1082-1 is depressed, then the first grid origin movement section 103 starts its processing illustrated in FIG. 6. Referring to FIG. 6, the effective grid currently displayed on the display apparatus 109 is erased (step S1). This is performed by changing the display flag 1021 illustrated in FIG. 5 of the effective grid in the display grid information storage section 102 to an "OFF" state. Then, the first grid origin movement section 103 accepts a selection input of a reference grid by the operator. In particular, if the operator depresses one of the buttons of the grid selection button set 1080 of FIG. 4, then the first grid origin movement section 103 reads out grid information corresponding to the thus depressed button from the grid information storage section 101 (step S2). Thereafter, the first grid origin movement section 103 adds the display flag 1021, which has been changed to an "ON" state, and the display form control information 1022, which has been changed to the full display form, to the thus read out grid information and supplies resulting information to the display grid information storage section 102 to display the reference grid selected by the operator on the display apparatus 109 (step S3). Then, the first grid origin movement section 103 changes the display grid information storage section 102 of the effective grid held in the display grid information storage section 102 to an "ON" state and changes the display form control information 1022 to the origin display form to display the origin of the effective grid on the display apparatus 109 again (step S4).

Figure 7A:
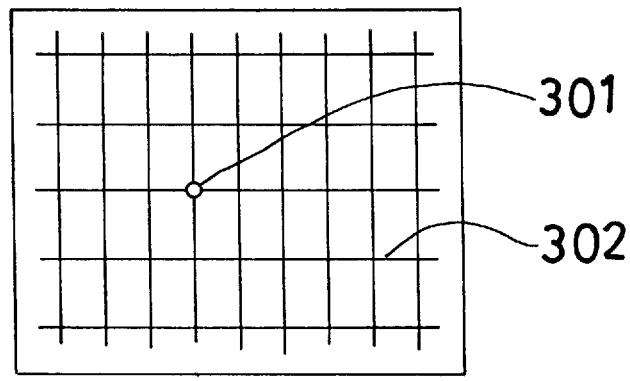
FIGS. 7(a), 7(b) and 7(c) are diagrams illustrating an example of a movement of the origin with respect to another grid.
Figure 7B:
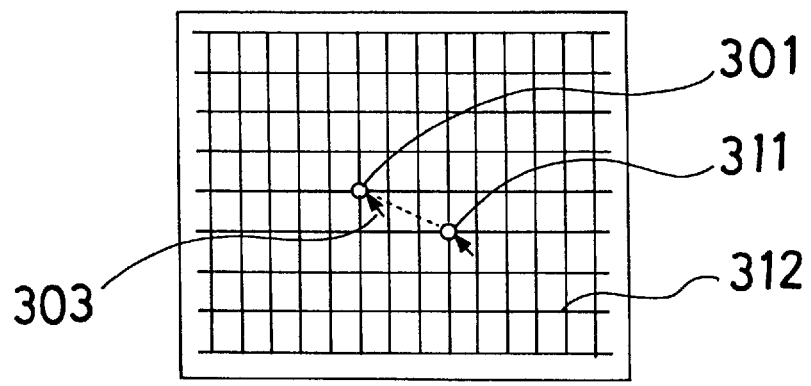
Figure 7C:
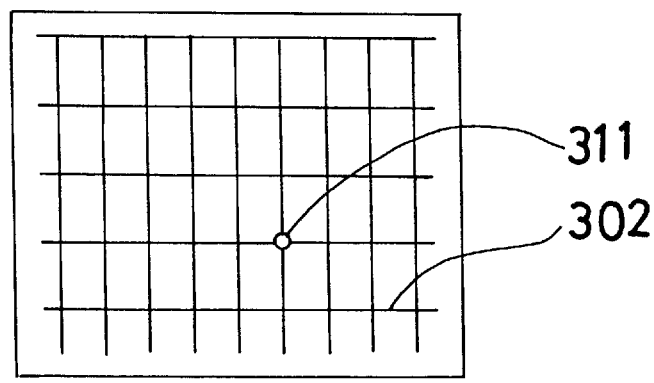

By the processing described above, when the first grid origin movement button 1082-1 is depressed and a grid to be used as a reference is selected while, for example, such an effective grid 302 as shown in FIG. 7(*a*) is displayed on the screen of the display apparatus 109, the origin 301 of the effective grid 302 and the reference grid 312 selected by the operator are displayed on the screen of the display apparatus 109 as shown in FIG. 7(*b*).

In this condition, the operator can move the origin 301 to an arbitrary position by a manual operation of the mouse 113. In particular, if the origin 301 is dragged by the mouse 113, then the first grid origin movement section 103 reads coordinate values of a mouse cursor 303 in the drag from the mouse control section 114 and updates the origin coordinate values 1012 of the grid information of the effective grid of the display grid information storage section 102 to move the origin 301 on the screen of the display apparatus 109 (step S5). Then, if the operator ends its mouse drag and releases the mouse button, for example, at a position 311 of FIG. 7(*b*), then the first grid origin movement section 103 snaps the final movement position of the origin 301 to a grid point of the reference grid in the proximity of the position 311 and then sets the snapped coordinate values to the origin coordinate values of the grid information of the effective grid in the display grid information storage section 102 and the grid information storage section 101 (step S6). Then, the display grid information of the reference grid held in the display grid information storage section 102 is erased to erase the display of the reference grid (step S7). Instead, the display flag 1021 of the display grid information of the effective grid in the display grid information storage section 102 is changed to an "ON" state to display the effective grid after the movement of the origin on the screen of the display apparatus 109 again (step S8). Consequently, such a screen as shown in FIG. 7(*c*)

is displayed wherein the origin 301 of the effective grid 302 has been moved with reference to the reference grid 312.

Figure 8A:
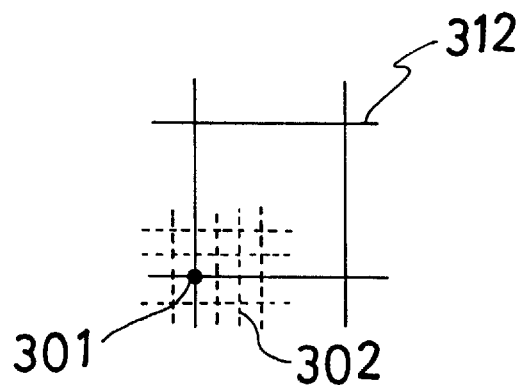
FIGS. 8(a), 8(b), 8(c) and 8(d) are diagrammatic views illustrating an example of a procedure of an inputting operation of a graphic form including a movement of the origin of a grid with reference to another grid.
Figure 8B:
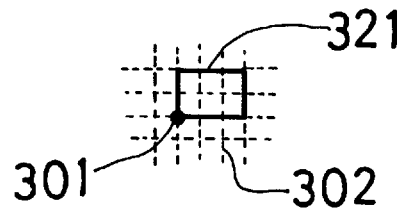
Figure 8C:
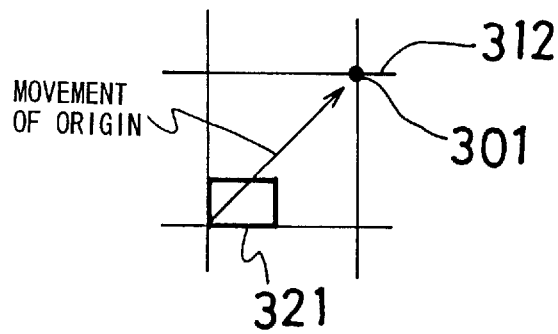
Figure 8D:
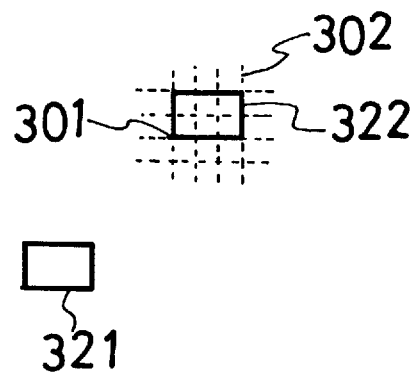

FIGS. 8(a) to (d) illustrate an example of production of a graphic form involving a movement of the origin of an effective grid with reference to another grid. FIG. 8(a) illustrates a relative positional relationship between an effective grid 302 and a reference grid 312 in an initial state in which the origin 301 of the effective grid 302 is positioned on a certain grid point of the reference grid 312. FIG. 8(b) illustrates another state wherein the effective grid 302 is displayed on the screen of the display apparatus 109 and a rectangle 321 indicated by solid lines in FIG. 8(b) is inputted. FIG. 8(c) illustrates a process of displaying the reference grid 312 on the screen of the display apparatus 109 and moving the origin 301 of the effective grid 302 to an adjacent right upward grid point of the reference grid 312. FIG. 8(d) illustrates a still further state wherein another rectangle 322 is inputted using the effective grid 302 after the movement of the origin. The distance between the rectangle 321 and the rectangle 322 is equal to the distance of opposing grid points of the reference grid 312.

For example, where the grid line distances of the effective grid 302 are 3 mm for both of the X and Y directions and the grid line distances of the reference grid 312 are 20 mm for both of the X and Y directions, then the distance between the rectangle 321 and rectangle 322 is $(20^2+20^2)^{1/2}$. A plurality of rectangles having such a positional relationship as just described cannot be produced using only the effective grid 302, and if it is tried to produce them using a single grid, then a fine grid whose grid line distances are 1 mm for both of the X and Y directions must be used and, in order to assure an accurate distance between different graphic forms, fine gird line distances must be mounted accurately. In contrast, if the origin moving function described hereinabove with reference to FIG. 8 is used, such positioning can be performed simply.

1-2) Operation when the button 1082-2 is depressed

Figure 9:
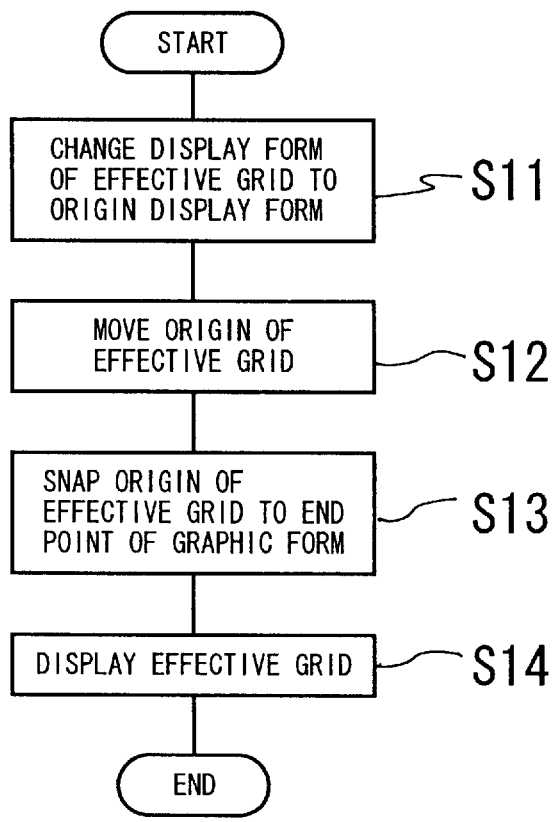
FIG. 9 is a flow chart illustrating an example of processing for movement of the origin with reference to an end point of a graphic form by the first grid origin movement section shown in FIG. 1.
Figure 10A:
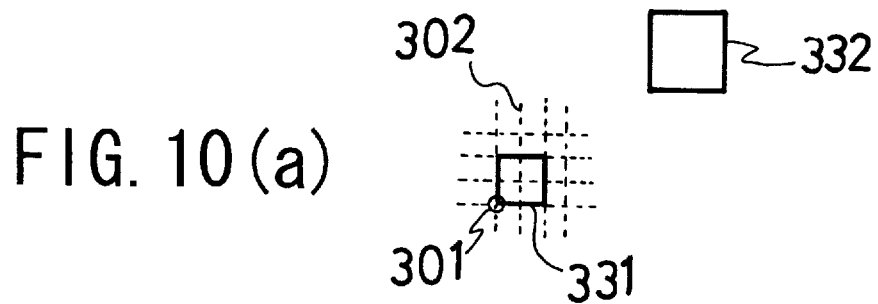
FIGS. 10(a), 10(b), and 10(c) are diagrammatic views illustrating a procedure of an inputting operation of a graphic form including a movement of the origin of the graphic form with reference to an end point of the graphic form.

If the button 1082-2 is depressed, then the first grid origin movement section 103 starts its processing illustrated in FIG. 9. Referring to FIG. 9, the first grid origin movement section 103 first changes the display form control information 1022 of the effective grid in the display grid information storage section 102 to the origin display form so that the effective grid displayed on the display apparatus 109 is changed to a display only of the origin (step S11). For example, if the button 1082-2 is depressed while the effective grid 302 is displayed on the screen of the display apparatus 109 as shown in FIG. 10(a), only the origin 301 of the effective grid 302 is thereafter displayed. It is to be noted that, while, in FIG. 10(a), a rectangle 331 is produced using the effective grid 302, the rectangle 331 remains displayed. While also another rectangle 332 is present, this rectangle 332 also remains displayed. It is to be noted that the rectangle 332 is a graphic form produced using another grid.

Figure 10B:
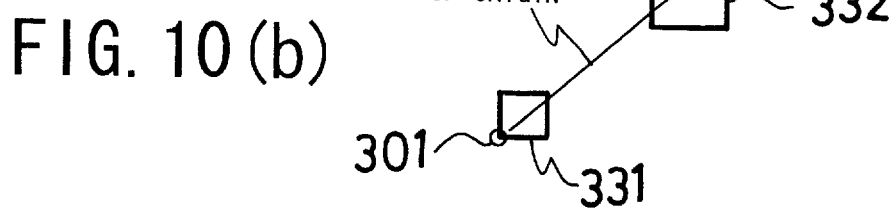

In a state shown in FIG. 10(b), the origin 301 can be moved to an arbitrary position by a manual operation of the mouse 113. If the origin 301 is dragged by means of the mouse 113, then the first grid origin movement section 103 reads coordinate values of the mouse cursor in the drag from the mouse control section 114 and updates the origin coordinate values 1012 of the grid information of the effective grid in the display grid information storage section 102 to move the origin on the screen of the display apparatus 109 (step S12). Then, if the operator ends the mouse dragging and releases the mouse button, then the first grid origin movement section 103 snaps the final movement position of the origin to an end point of the graphic form in the proximity of the position of the final movement position (step S13). In particular, the first grid origin movement section 103 calculates the distances between end points of the graphic form stored in the graphic form information storage section 112 and the final movement position of the origin and snaps the final movement position to one of the end points of the graphic form which presents a shortest one of the distances. Then, the first grid origin movement section 103 sets coordinate values of the thus snapped point to the origin coordinate values of the grid information corresponding to the effective grid in the display grid information storage section 102 and the grid information storage section 101, and changes the display flag 1021 in the display grid information of the effective grid in the display grid information storage section 102 to an "ON" state to display the effective grid after the movement of the origin on the screen of the display apparatus 109 (step S14).

Figure 10C:
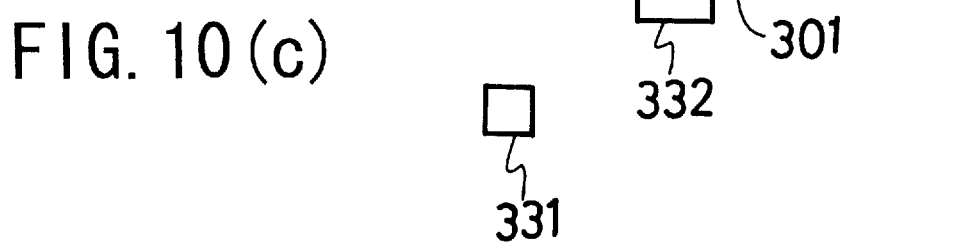

Accordingly, if the operator drags the origin 301 to an end point of the rectangle 332 as seen in FIG. 10(b) and then releases the mouse button, then the screen of the display apparatus 109 displays in such a manner as seen in FIG. 10(c). As a result, the origin 301 of the effective grid 302 is moved to an end point of the rectangle 332.

1-3) Operation when the button 1082-3 is depressed

If the button 1082-3 is depressed, then the first grid origin movement section 103 renders the origin of an effective grid into a draggable condition. Consequently, the operator can move the origin of the effective grid to an arbitrary position by a manual operation of the mouse 113. After the origin of the effective grid is dragged by the mouse 113, the first grid origin movement section 103 reads coordinate values of the mouse cursor in the drag from the mouse control section 114 and updates the origin coordinate values 1012 in the grid information of the effective grid of the display grid information storage section 102 to move the origin on the screen of the display apparatus 109. Then, if the operator ends the mouse drag and releases the mouse button, then the first grid origin movement section 103 sets coordinate values of the final movement position of the origin to the origin coordinate values of the grid information corresponding to the effective grid in the grid information storage section 101. Consequently, the origin of the effective grid is moved to a position of arbitrary coordinate values.

2) Movement of the origin by the third grid origin movement section 105

When an operator wants to change over an effective grid displayed on the display apparatus 109 to another grid in order to perform inputting or editing of a graphic form, if the origin of the grid after the change-over is to be adjusted to the origin of the currently effective grid, then the operator depresses the grid change-over button 1081-1 of FIG. 4 of the grid changing operation button set 108 and then depresses one of the buttons of the grid selection button set 1080 corresponding to the grid of the object of the change-over. On the other hand, when the operator wants to leave the origin of the grid after the change-over at the position of the coordinate values stored in the grid information storage section 101, the operator depresses the grid change-over button 1081-2 of FIG. 4 of the grid changing operation button set 108 and then depresses one of the buttons of the grid selection button set 1080 corresponding to the grid of the object of the change-over.

2-1) Operation when the button 1081-1 is depressed

Figure 11:
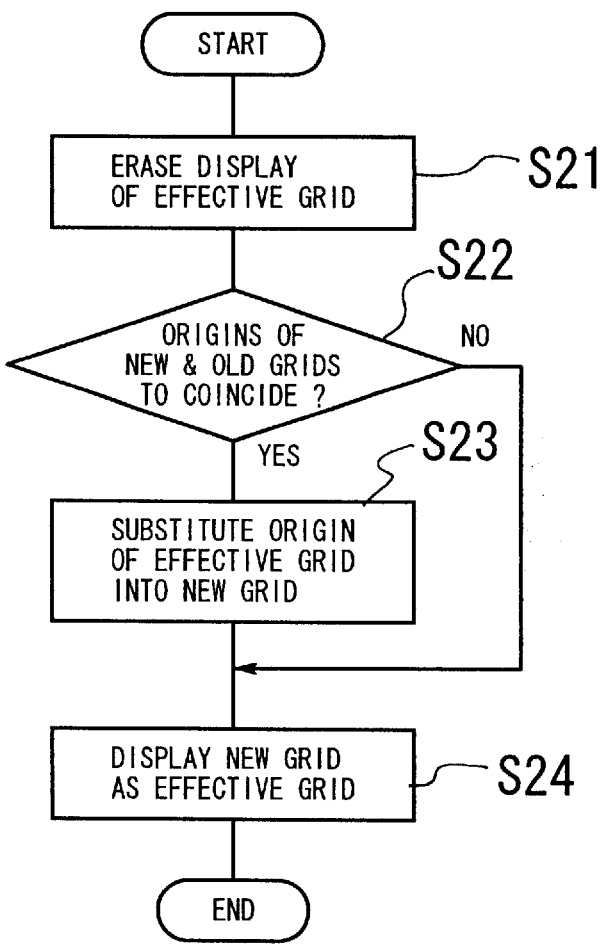
FIG. 11 is a flow chart illustrating an example of processing of a third grid origin movement section shown in FIG. 1.

If the button 1081-1 is depressed, the third grid origin movement section 105 starts its processing illustrated in FIG. 11. Referring to FIG. 11, the third grid origin movement section 105 first changes the display flag 1021 of the effective grid in the display grid information storage section 102 to an "OFF" state to erase the display of the effective grid (step S21). Then, the third grid origin movement section 105 determines whether or not the origins of the new and old grids should be made coincide with each other (step S22). In the present case, since the button 1081-1 is depressed, the result of determination at step S22 is YES, and the third grid origin movement section 105 reads out the origin coordinate values of the effective grid having been displayed then from the display grid information storage section 102 and substitutes them into the origin coordinate values 1012 of that grid information stored in the grid information storage section 101 which corresponds to the grid of the destination of the change-over selected by the grid selection button set 1080 (step S23). Then, the third grid origin movement section 105 erases the display grid information of the effective grid having been displayed till then from the display grid information storage section 102, reads out grid information of the grid after the change-over from the grid information storage section 101, adds the display flag 1021 which is in an "ON" state and the display form control information 1022 indicative of the full display form to the read out grid information and stores resulting information into the display grid information storage section 102 to display the new grid as an effective grid on the screen of the display apparatus 109 (step S24). As a result, a change-over between new and old grids is performed so that the origin of the new grid may coincide with the origin of the old grid.

2-2) Operation when the button 1081-2 is depressed

Also when the button 1081-2 is depressed, the third grid origin movement section 105 starts its processing illustrated in FIG. 11 and first erases the display of the effective grid (step S21). Then, since the button 1081-2 has been depressed, the third grid origin movement section 105 determines that the origins of the new and old grids should not coincide with each other. Thus, the third grid origin movement section 105 erases the display grid information of the effective grid which has been displayed till then from the display grid information storage section 102, reads out grid information of the grid after the change-over selected by the grid selection button set 1080 from the grid information storage section 101, adds the display flag 1021 representing an on state and the display form control information 1022 of the full display form to the read out grid information, and stores resulting information into the display grid information storage section 102 to display the new grid as an effective grid on the screen of the display apparatus 109 (step S24).

3) Movement of the origin by the second grid origin movement section 104

Figure 12:
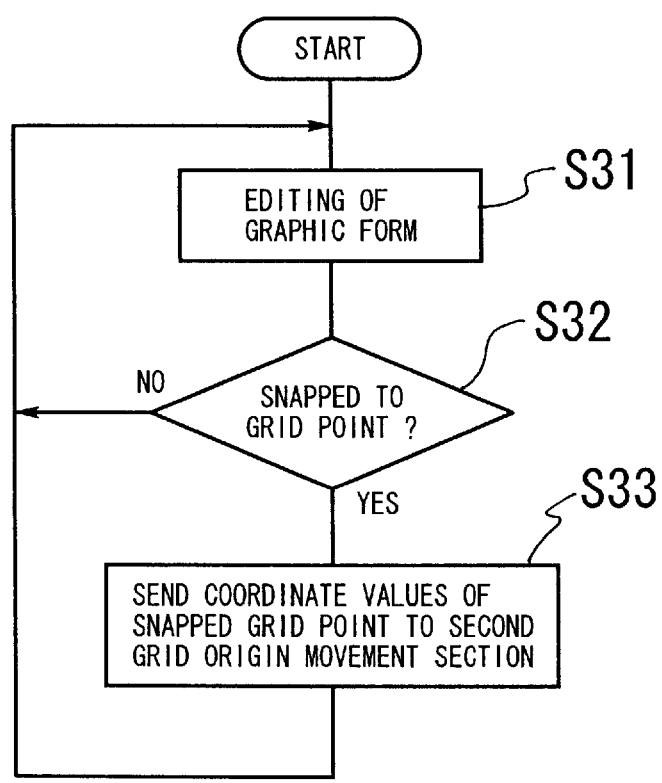
FIG. 12 is a flow chart illustrating an example of processing of a graphic form editing section shown in FIG. 1.
Figure 13:
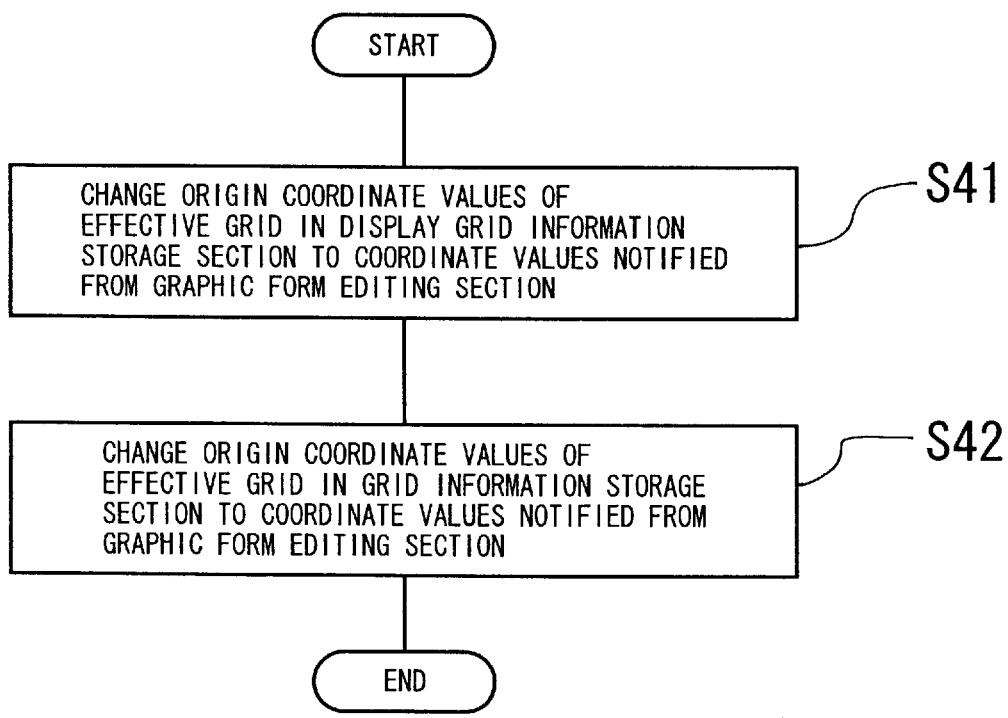
FIG. 13 is a flow chart illustrating an example of processing of a second grid origin movement section shown in FIG. 1.

The graphic form editing section 111 performs processing such as production of new graphic form information or amendment to graphic form information in response to a manual graphic form editing operation by means of the mouse 113 by an operator, and if it executes, during the procedure of the processing, processing of snapping coordinate values inputted by the operator to a grid point of the effective grid, it notifies the thus snapped grid point to the second grid origin movement section 104. FIG. 12 is a flow chart of such processing. Referring to FIG. 12, when snapping to a grid point is performed during graphic form editing processing in step S31 (YES in step S32), the graphic form editing section 111 notifies the coordinate values of the grid point to the second grid origin movement section 104 (step S33), whereafter the control sequence returns to step S31 to continue the graphic form editing processing.

When the coordinate values of the grid point are notified from the graphic form editing section 111, the second grid origin movement section 104 changes the origin coordinate values of the effective grid stored in the display grid information storage section 102 to the coordinate values notified from the graphic form editing section 111 (step S41). Further, the second grid origin movement section 104 changes the origin coordinate values of the effective grid stored in the grid information storage section 101 to the coordinate values notified from the graphic form editing section 111 (step S42).

By the processing described above, the origin of the effective grid can be automatically moved to the snapped grid point in an interlocking relationship with the snapping processing to an effective grid point.

The effect of the second grid origin movement section 104 is exhibited significantly by combining it with the third grid origin movement section 105 which makes the origins of new and old grids coincide with each other upon changing over between grids. In the following, this will be described taking production of a concrete graphic form as an example with reference to FIGS. 14(a)–14(f).

Figure 14:
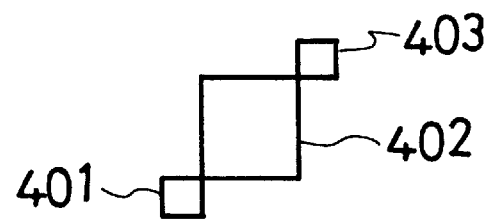
FIGS. 14(a) to 14(f) are diagrammatic views illustrating an example of a procedure of an inputting operation of a graphic form including a movement of the origin by the second grid origin movement section shown in FIG. 1 and another movement of the origin by the third grid origin movement section shown in FIG. 1 which is performed in order to make, upon changing over of an effective grid to another grid, the origins of the new and old grids coincide with each other.
Figure 14:
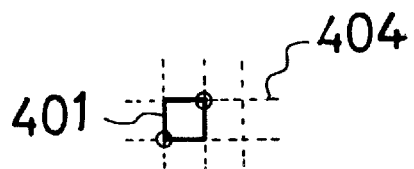
Figure 14:
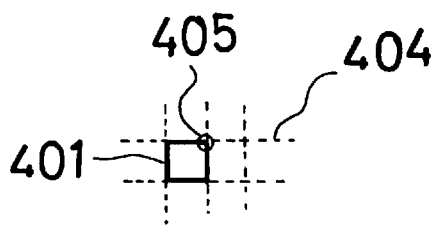
Figure 14:
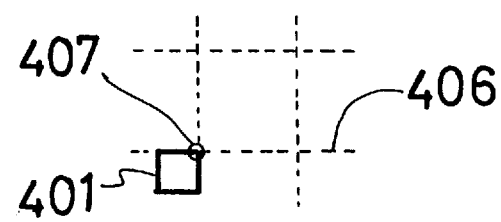
Figure 14:
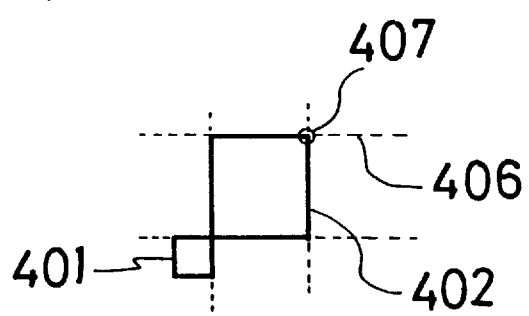
Figure 14:
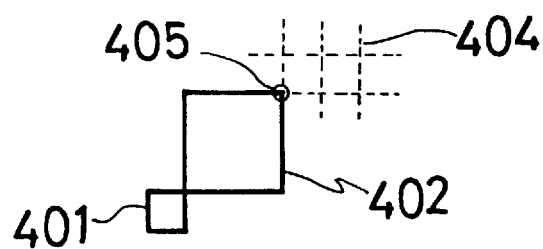

It is considered that, for example, a graphic form including a rectangle 401 of 5 mm×5 mm, another rectangle 402 of 13 mm×13 mm contiguous to the right upper end point of the rectangle 401 and a further rectangle 403 of 5 mm×5 mm contiguous to the right upper end point of the rectangle 402 as shown in FIG. 14(a) is produced using a grid 404 whose grid distances for the X and Y directions are 5 mm and another grid 406 whose grid distances for X and Y are 13 mm. First, the grid 404 is displayed on the screen of the display apparatus 109 as shown in FIG. 14(b), and then two opposing grid points are designated by the mouse cursor of the mouse 113 to produce the rectangle 401. In this instance, a point which is to make the left lower end point of the rectangle 401 is designated first, and then another point which is to make the right upper end point is designated. In this instance, since the last snapping processing of the graphic form editing section 111 is the right upper end point of the rectangle 401, the origin 405 of the grid 404 is moved to the right upper end point of the rectangle 401 as seen in FIG. 14(c) by the processing of the second grid origin movement section 104 described hereinabove.

If, in this condition, the grid change-over button 1081-1 and one of the buttons of the grid selection button set 1080 of FIG. 4 are depressed to change over the effective grid to the grid 406, then the origin 407 of the grid 406 after the change-over is moved to the position at which the origin 405 of the grid 404 has been till then, that is, to the right upper end point of the rectangle 401 as seen in FIG. 14(d) by the processing of the third grid origin movement section 105 described hereinabove. Consequently, the points which are to make the left lower end point and the right upper end point of the rectangle 402 can be designated immediately.

Then, if the designation is performed in the order of the left lower end point and the right upper end point of the rectangle 402, then since the last snapping processing of the graphic form editing section 111 is performed for the right upper end point of the rectangle 402, the origin 407 of the grid 406 moves to the right upper end point of the rectangle 402 as shown in FIG. 14(e) by the processing of the second grid origin movement section 104 described hereinabove. Accordingly, if, in this condition, the effective grid is changed over to the grid 404, then the grid 404 is displayed in such a manner as seen in FIG. 14(f) by the processing of the third grid origin movement section 105. Consequently, an end point of the next rectangle 403 can be designated immediately.

3) Change of the grid line distances by the grid line distance changing section 106

When an operator wants to change the grid line distances of an effective grid displayed on the display apparatus 109 in order to perform inputting or editing of a graphic figure, if the grid line distances should be changed with reference to another grid, the button 1084-1 of FIG. 4 of the grid changing operation button set 108 is depressed; if the grid line distances should be change with reference to an end point of a graphic form produced already, the button 1084-2 is depressed; but if the grid line distances should be changed with reference to a position of arbitrary coordinate values, the button 1084-3 is depressed.

3-1) Operation when the button 1084-1 is depressed

Figure 15:
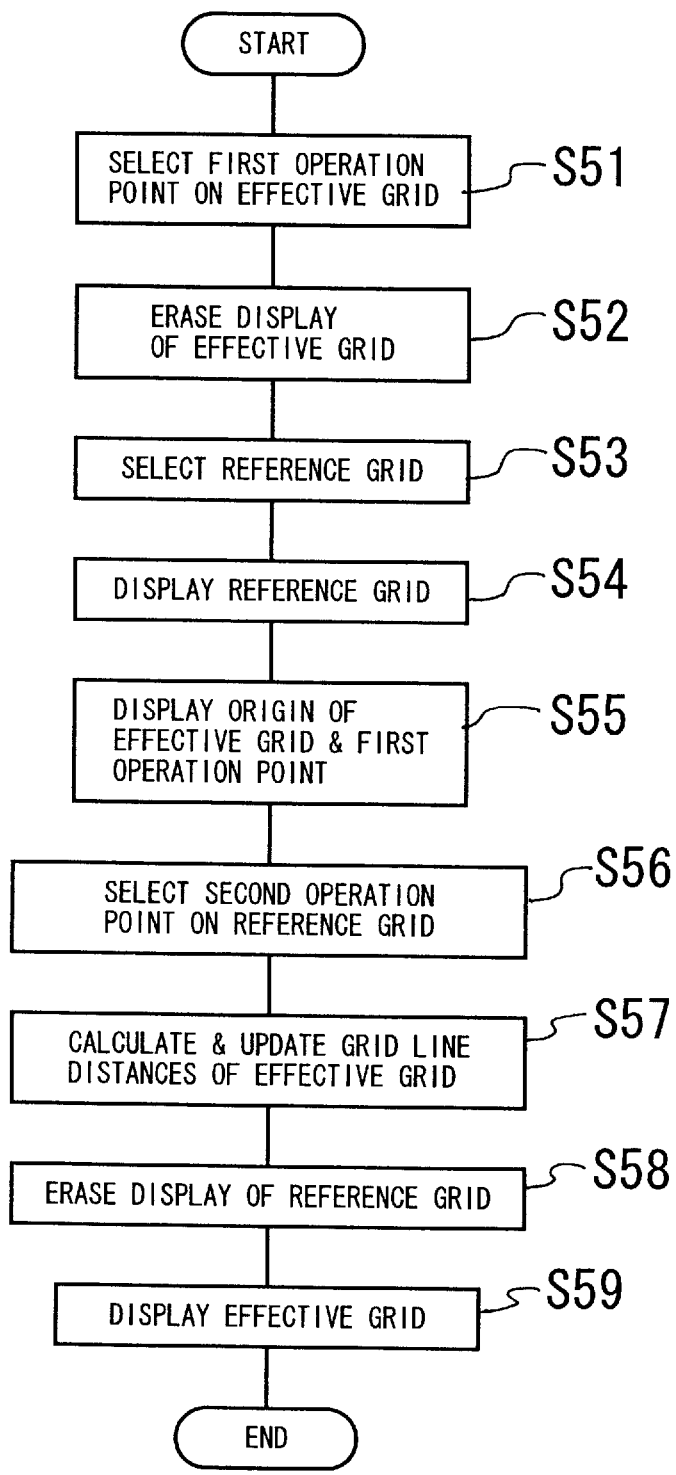
FIG. 15 is a flow chart illustrating an example of processing of changing the distances of grid lines with reference to another grid by a grid line distance changing section shown in FIG. 1.

When the button 1084-1 is depressed, the grid line distance changing section 106 starts its processing illustrated in FIG. 15. First, the operator will select a first operation point on an effective grid (step S51). This is performed, for example, in the following manner.

First, the operation point control information 1024 illustrated in FIG. 5 in the display grid information storage section 102 is rendered effective and predetermined coordinate values of an operation point symbol are set. Consequently, a symbol such as, for example, a mark x indicative of an operation point is displayed at a predetermined position on the screen of the display apparatus 109 by the display control section 110. The symbol of the operation point can be moved to an arbitrary position by a manual dragging operation of the mouse. If the operator moves the symbol of the operation point by a manual dragging operation and releases the mouse button at a position after the movement, then the grid line distance changing section 106 determines coordinate values of a grid point of the effective grid which is nearest to the position of the coordinate values as coordinate values of the first operation point.

Figure 16A:
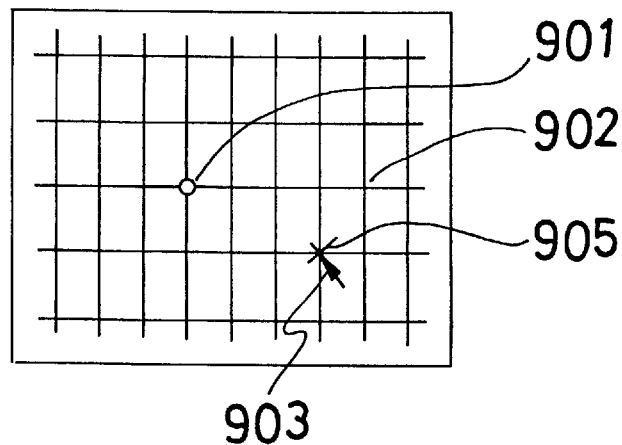
FIGS. 16(a), 16(b) and 16(c) are diagrammatic views illustrating an example of a change of the distances of grid lines of a grid with reference to another grid.
Figure 16B:
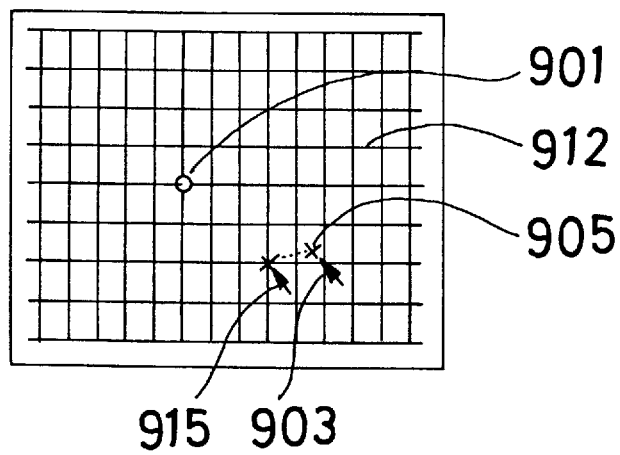
Figure 16C:
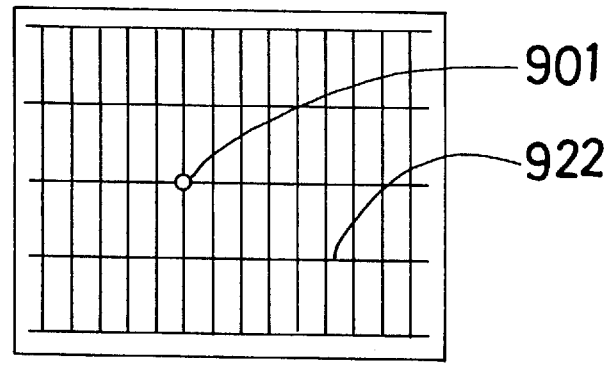

FIG. 16(*a*) illustrates a manner in this instance. Referring to FIG. 16(*a*), reference numeral 902 denotes the effective grid, 901 the origin of the effective grid 902, 903 the mouse cursor, and 905 the symbol of the operation point. If the mouse button is released in the condition shown in FIG. 16(*a*), then a grid point (3, −1) of the grid 902 is selected as the first operation point. The grid line distance changing section 106 stores coordinate values of the first operation point into the inside thereof.

Then, the grid line distance changing section 106 changes the display flag 1021 of the effective grid currently displayed on the display apparatus 109 to an "OFF" state to erase the display of the effective grid once (step S52). Then, a selection input of a reference grid by the operator is accepted, and if the operator depresses one of the buttons of the grid selection button set 1080 of FIG. 4, then the grid information corresponding to the depressed button is read out from the grid information storage section 101 (step S53). Then, the grid line distance changing section 106 adds the display flag 1021, which has been changed to an "ON" state, and the display form control information 1022, which has been changed to the full display form, to the thus read out grid information and supplies resulting information to the display grid information storage section 102 to display the reference grid selected by the operator on the display apparatus 109 (step S54). It is to be noted that, in this instance, processing of adjusting the origin of the reference grid to the origin of the preceding effective grid may be added. Then, the display flag 1021 of the effective grid held in the display grid information storage section 102 is changed to an "ON" state and the the display form control information 1022 is changed to the origin and operation point display form to display both of the origin of the effective grid and the operation point on the display apparatus 109 (step S55). By such a sequence of operations as described above, the origin 901 of the effective grid 902 and the symbol 905 of the operation point are displayed on a reference grid 912 on the screen of the display apparatus 109 as shown in FIG. 16(*b*).

In this condition, the operator can move the symbol 905 of the operation point to an arbitrary position again by a manual operation of the mouse. If the operator moves the symbol 905 by a mouse dragging operation and releases the mouse button, for example, at a location of a position 915 of FIG. 16(*b*), then the grid line distance changing section 106 determines coordinate values of a grid point (3, −2) of the reference grid 912 which is nearest to the position of coordinate values of the mouse cursor then as coordinates of the second operation point (step S56).

Then, the grid line distance changing section 106 calculates the grid line distances of the effective grid from the coordinate values of the second operation point and the coordinate values of the first operation point (step S57). In particular, the grid line distance changing section 106 calculates the grid line distances of the effective grid such that the first operation point corresponds to the second operation point with the origin 901 of the effective grid fixed. It is to be noted that the grid line distance changing section 106 simultaneously changes the grid line distance values 1013 of the grid information of the effective grid in the display grid information storage section 102 and the grid information storage section 101 with the values thus calculated (step S57).

Thereafter, the grid line distance changing section 106 erases the display grid information of the reference grid in the display grid information storage section 102 to erase the display of the reference grid (step S58) and then changes the display flag 1021 in the display grid information storage section 102 to an "ON" state and changes the display form control information 1022 to the full display form to display the effective grid on the screen of the display apparatus 109 again (step S59). It is to be noted that also the operation point control information 1024 is rendered ineffective. Consequently, such a display screen as seen in FIG. 16(*c*) is displayed on the display apparatus 109, wherein an effective grid 922 after the change of the grid line distances and the origin 901 of the effective grid 922 are displayed. In the example shown in FIGS. 16(*a*) to 16(*c*), since the grid line distances are changed so that the grid point (3, −1) of the effective grid 902 may correspond to the grid point (3, −2) of the reference grid 912, the grid line distance of the effective grid 922 in the X direction is equal to that of the reference grid 912, but the grid line distance in the Y direction is equal to twice that of the reference grid 912.

3-2) Operation when the button 1084-2 is depressed

If the button 1084-2 is depressed, then the grid line distance changing section 106 starts its processing illustrated in FIG. 17. Referring to FIG. 17, first, similarly as in step S51 of FIG. 15, a grid point which is to serve as a first operation point on the effective grid is selected by the operator (step S61), and the display of the effective grid is erased once (step S62). Then, the grid line distance changing section 106 accepts coordinate values of a second operation point by a designation of the mouse cursor of the mouse 113 (step S63). Then, the grid line distance changing section 106 discriminates whether or not snapping is required (step S64). In the present case, since the button 1084-2 is depressed, it is discriminated that snapping is required, and the grid line distance changing section 106 searches the graphic form information storage section 112 for a graphic form end point nearest to the position of the coordinate values inputted by the operator and determines coordinate values of the thus searched out graphic form end point as coordinate values of the second operation point (step S65). Then, based on the coordinate values of the second operation point and the coordinate values of the first operation point, the grid line distance changing section 106 calculates such grid line distances of the effective grid that the first operation point corresponds to the second point with the origin of the effective grid fixed, and changes the grid line distance values 1013 of the grid information of the effective grid in the display grid information storage section 102 and the grid information storage section 101 with the thus calculated values (step S67). Then, the grid line distance changing section 106 changes the display flag 1021 of the effective grid in the display grid information storage section 102 to an on state and changes the display form control information 1022 to the full display form to display the effective grid after the change on the screen of the display apparatus 109 (step S68).

3-3) Operation when the button 1084-3 is depressed

Also when the button 1084-3 is depressed, the grid line distance changing section 106 starts its processing illustrated in FIG. 17. Referring to FIG. 17, first, a grid point which is to serve as a first operation point on an effective grid is selected by the operator (step S61), and the display of the effective grid is erased once (step S62). Then, the grid line distance changing section 106 accepts coordinate values of a second operation point by a designation of the mouse cursor of the mouse 113 (step S63). Then, since snapping is not required in this instance, the grid line distance changing section 106 determines the the inputted coordinate values themselves as coordinate values of the second operation point (step S66). Then, the grid line distance changing section 106 calculates such grid line distances of the effective grid that the first operation point corresponds to the second point with the origin of the effective grid fixed, and changes the grid line distance values 1013 of the grid information of the effective grid in the display grid information storage section 102 and the grid information storage section 101 with the thus calculated values (step S67). Then, the grid line distance changing section 106 causes the effective grid after the change of the grid line distances to be displayed on the screen of the display apparatus 109 (step S68).

4) Change of the grid axis inclination angle by the grid axis inclination angle changing section 107

When an operator wants to change the inclination angle of a grid axis of an effective grid displayed on the display apparatus 109 in order to perform inputting or editing of a graphic form, if the inclination angle should be changed with reference to another grid, the button 1083-1 of FIG. 4 of the grid changing operation button set 108 is depressed; if the inclination angle should be changed with reference to an end point of a graphic form produced, the button 1083-2 is depressed; and if the inclination angle should be changed with reference to a position of arbitrary coordinate values, the button 1083-3 is depressed.

4-1) Operation when the button 1083-1 is depressed

Figure 18:
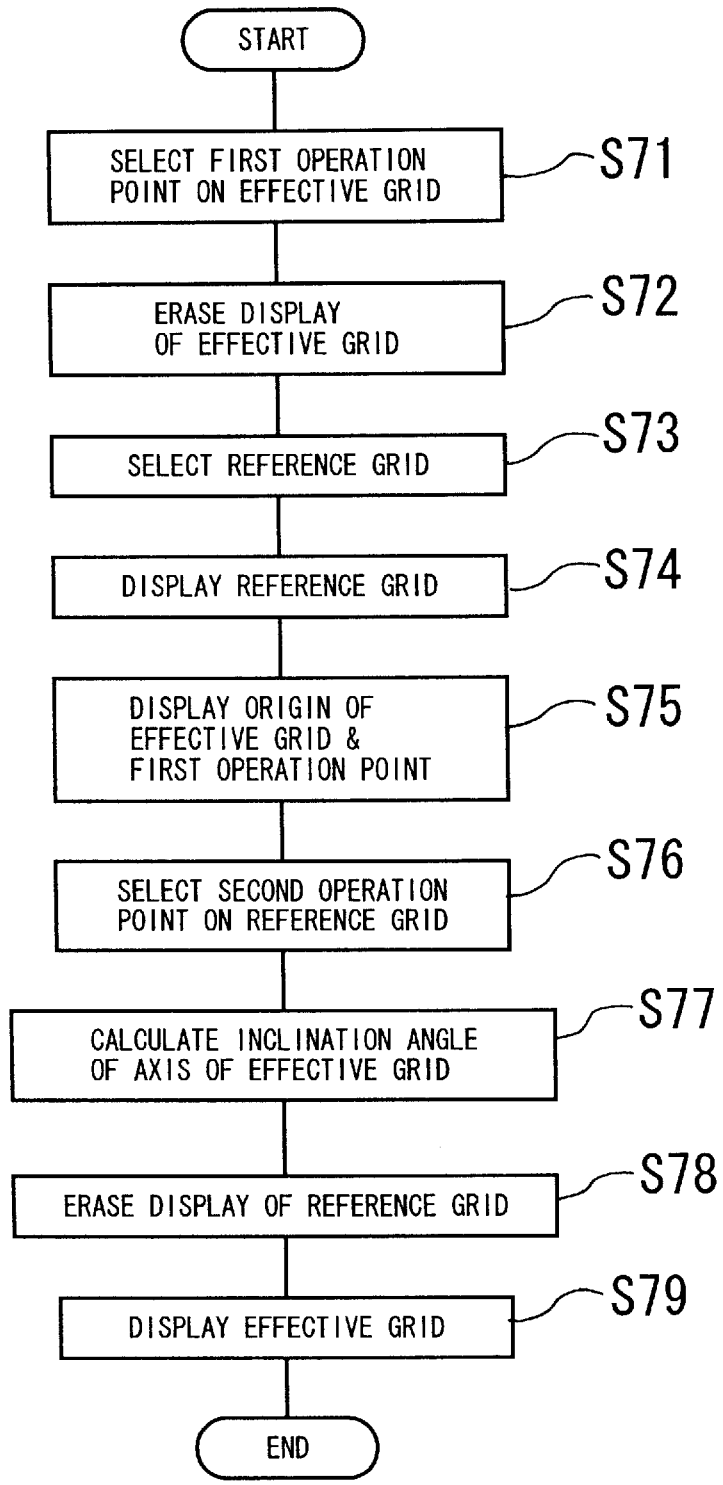
FIG. 18 is a flow chart illustrating an example of processing for changing the inclination of a grid axis of a grid with reference to another grid by a grid axis inclination angle changing section shown in FIG. 1.

If the button 1083-1 is depressed, then the grid axis inclination angle changing section 107 starts its processing illustrated in FIG. 18. Referring to FIG. 18, first, the grid axis inclination angle changing section 107 urges the operator to select a first operation point on the effective grid (step S71). This is performed, similarly as in step S51 of FIG. 15, in the following manner.

First, the grid axis inclination angle changing section 107 renders the operation point control information 1024 illustrated in FIG. 5 in the display grid information storage section 102 effective and sets predetermined coordinate values. Consequently, a symbol such as, for example, a mark x indicative of an operation point is displayed at a predetermined position on the screen of the display apparatus 109 by the display control section 110. The symbol of the operation point can be moved to an arbitrary position by a manual dragging operation of the mouse. If the operator moves the symbol of the operation point by a manual dragging operation and releases the mouse button at a position after the movement, the grid axis inclination angle changing section 107 determines coordinate values of a grid point of the effect grid nearest to the position of the coordinate values then as coordinate values of the first operation point.

FIG. 19(a) illustrates a manner in this instance. Referring to FIG. 19(a), reference numeral 1102 denotes an effective grid, 1101 the origin of the effective grid 1102, 1103 the mouse cursor, and 1105 the symbol of the operation point. If the mouse button is released in the condition illustrated in FIG. 19(a), coordinate values of a grid point on a radial grid axis of the effective grid 1102 having the inclination of 45 degrees are selected as coordinate values of the first operation point. The grid axis inclination angle changing section 107 stores the coordinate values of the first operation point into the inside thereof.

Then, the grid axis inclination angle changing section 107 changes the display flag 1021 of the effective grid currently displayed on the display apparatus 109 to an "OFF" state to erase the display of the effective grid once (step S72). Then, the grid axis inclination angle changing section 107 accepts a selection input of a reference grid by an operator, and if the operator depresses one of the buttons of the grid selection button set 1080 of FIG. 4, then the grid axis inclination angle changing section 107 reads out grid information corresponding to the depressed button from the grid information storage section 101 (step S73). Then, the grid axis inclination angle changing section 107 adds the display flag 1021, which has been changed to an "ON" state, and the display form control information 1022, which has been changed to the full display form, to the thus read out grid information and cumulatively stores resulting information into the display grid information storage section 102 to display the reference grid selected by the operator on the display apparatus 109 (step S74). It is to be noted that, in this instance, processing of adjusting the origin of the reference grid to the origin of the preceding effective grid. Thereafter, the grid axis inclination angle changing section 107 changes the display flag 1021 of the effective grid held in the display grid information storage section 102 to an "ON" state and changes the display form control information 1022 to the origin and operation point display form to display the origin of the effective grid and the operation point on the display apparatus 109 (step S75). By such a sequence of operations as described above, the origin 1101 of the effective grid 1102 and the symbol 1105 of the operation point pointing out the first operation point are displayed on the graphic form information storage section 112 on the screen of the display apparatus 109 as seen in FIG. 19(b).

In this condition, the symbol 1105 of the operation point can be moved circularly around the origin of the graphic form information storage section 112 by a manual operation of the mouse. If the operator circularly moves the symbol 905 of the operation point by a manual operation of the mouse and then releases the mouse button, for example, at the location of an operation point symbol 1115 of FIG. 19(*b*), then the grid axis inclination angle changing section 107 determines coordinate values of a grid point of the reference grid 912 nearest to the position of coordinate values of the mouse cursor then as coordinate values of the second operation point (step S76).

Then, the grid axis inclination angle changing section 107 calculates the inclination angle of the grid axis of the effective grid from the coordinate values of the second operation points and the coordinate values of the first operation point determined as described above (step S77). In particular, the grid axis inclination angle changing section 107 calculates such an inclination angle of the grid axis of the effective grid that the first operation point corresponds to the second operation point with the origin 1101 of the effective grid fixed. Then, the grid axis inclination angle changing section 107 changes the grid axis inclination rotational angle 1014 of the grid axis of the grid information of the effective grid in the display grid information storage section 102 and the grid information storage section 101 with a value obtained by the calculation (step S77).

Figure 19:
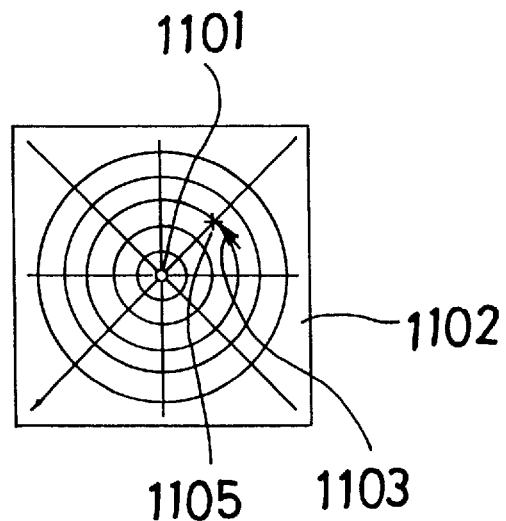
FIGS. 19(a), 19(b) and 19(c) are diagrammatic views illustrating an example of a change of the inclination angle of a grid axis of a grid with reference to another grid.
Figure 19:
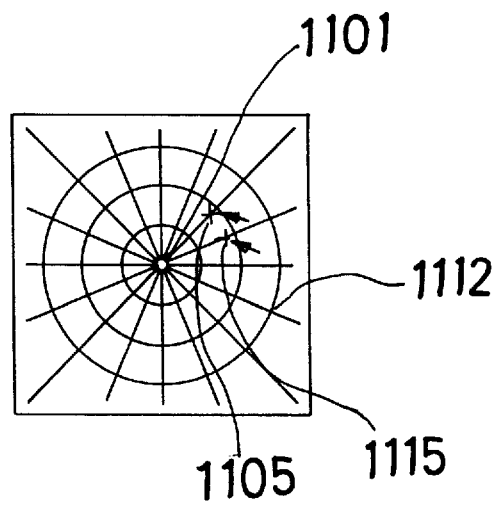
Figure 19:
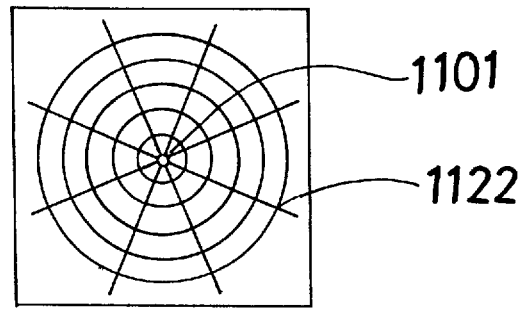

Thereafter, the grid axis inclination angle changing section 107 erases the display grid information of the reference grid from within the display grid information storage section 102 to erase the display of the reference grid (step S78). Then, the grid axis inclination angle changing section 107 changes the display flag 1021 of the effective grid in the display grid information storage section 102 to an "ON" state and changes the display form control information 1022 to the full display form to display the effective grid on the display apparatus 109 again (step S79). It is to be noted that also the operation point control information 1024 is rendered ineffective. Consequently, such a screen as shown in FIG. 19(*c*) is obtained, in which an effective grid 1122 after the inclination angle of the grid axis is changed and the origin 1101 of the effective grid 1102 are displayed. In the example of FIGS. 19(*a*) to 19(*c*), since a grid point on a radial grid axis of the effective grid 1102 having an inclination of 45 degrees is rotationally moved to another grid of the graphic form information storage section 112 having another inclination of 22.5 degrees, rotation of the axis by −22.5 degrees is performed.

4-2) Operation when the button 1083-2 is depressed

If the button 1083-2 is depressed, then the grid axis inclination angle changing section 107 starts its processing illustrated in FIG. 20. Referring to FIG. 20, first, similarly as in step S71 of FIG. 18, the grid axis inclination angle changing section 107 urges the operator to select a grid point which is to make a first operation point on an effective grid (step S81) and then erases the display of the effective grid once (step S82). Then, the grid axis inclination angle changing section 107 accepts coordinate values of a second operation point by the operator by a designation of the mouse cursor of the mouse 113 (step S83). Then, it is discriminated whether or not snapping is required (step S84). In the presence case, since the button 1083-2 has been depressed, it is determined that snapping is required, and the grid axis inclination angle changing section 107 searches the graphic form information storage section 112 for a graphic form end point nearest to the position of the coordinate values inputted by the operator and determines coordinate values of the graphic form end point as coordinate values of the second operation point (step S85). Then, based on the coordinate values of the second operation point and the coordinate values of the first operation points, the grid axis inclination angle changing section 107 calculates such an inclination angle of a grid axis of the effective grid that the first operation point corresponds to the second operation points, that is, the first operation point and the second operation point are located on a same radial grid axis, with the origin of the effective grid fixed. Then, the grid axis inclination angle changing section 107 changes the grid axis inclination rotational angle 1014 of the grid axis of the grid information of the effective grid in the display grid information storage section 102 and the grid information storage section 101 with a value obtained by the calculation (step S87). Then, the grid axis inclination angle changing section 107 changes the display flag 1021 of the effective grid in the display grid information storage section 102 to an "ON" state and changes the display form control information 1022 to the full display form and besides renders the operation point control information 1024 ineffective to display the effective grid after the change of the grid axis inclination angle on the screen of the display apparatus 109 (step S88).

4-3) Operation when the button 1083-3 is depressed

Also when the button 1083-3 is depressed, the grid axis inclination angle changing section 107 starts its processing illustrated in FIG. 20. First, the grid axis inclination angle changing section 107 urges an operator to select a grid point, which is to make a first operation point, on the effective grid (step S81) and erases the display of the effective grid once (step S82). Then, the grid axis inclination angle changing section 107 accepts coordinate values of a second operation point by the operator by a designation of the mouse cursor of the mouse 113 (step S83). Since no snapping is required, the grid axis inclination angle changing section 107 determines the inputted coordinate values as coordinate values of the second operation point (step S86). Then, the grid axis inclination angle changing section 107 calculates such an inclination angle of a grid axis of the effective grid that the first operation point corresponds to the second operation point, that is, the first operation point and the second operation point are located on a same radial grid axis, with the origin of the effective grid fixed, and changes the grid axis inclination rotational angle 1014 of the grid axis of the grid information of the effective grid in the display grid information storage section 102 and the grid information storage section 101 with a value obtained by the calculation (step S87). Then, the grid axis inclination angle changing section 107 displays the effective grid after the change of the grid axis inclination angle on the screen of the display apparatus 109 (step S88).

While the present invention is described above in connection with the preferred embodiment thereof, the present invention is not limited to the embodiment, but the embodiment can be modified, changed or altered in various manners. For example, while a grid of the orthogonal coordinate system type is used for description of operation of the first grid origin movement section 103, the second grid origin movement section 104, the third grid origin movement section 105 and the grid line distance changing section 106, they can be applied to a grid of the polar coordinate system type. Further, while a grid of the polar coordinate system type is used for description of operation of the grid axis inclination angle changing section 107, the grid axis inclination angle changing section 107 can be applied also to a grid of the orthogonal coordinate system type. Further, while the embodiment shown in FIG. 1 includes all of the first grid origin movement section 103, the second grid origin movement section 104 and third grid origin movement section 105, the grid line distance changing section 106, and the grid axis inclination angle changing section 107, the apparatus of the present invention may otherwise include a single one of them or a combination of a plurality of arbitrary ones of them.

What is claimed is:

1. A graphic form inputting apparatus wherein one of a plurality of grids, selected by an operator to input or edit a graphic form, is displayed as an effective grid on a screen of a display apparatus, and wherein operator inputted coordinate values of said screen are normalized to coordinate values of the effective grid, comprising:

grid information storage means for storing grid information of individual attributes of the plurality of grids; and grid origin movement means for (i) causing one of the other of the plurality of grids to be displayed as a reference grid together with an origin of the effective grid, when a request from the operator to move an origin of the effective grid is received, (ii) normalizing inputted origin destination coordinate values to coordinate values of the reference grids, and (iii) changing coordinate values of the origin of the effective grid to coordinate values of the reference grid obtained by the normalization.

2. A graphic form inputting apparatus wherein one of a plurality of grids, selected by an operator to input or edit a graphic form, is displayed as an effective grid on a screen of a display apparatus, and wherein operator inputted coordinate values of said screen are normalized to coordinate values of the effective grid, comprising:

grid information storage means for storing grid information of individual attributes of the plurality of grids: and first grid origin movement means for changing coordinate values of an origin of the effective grid to coordinate values obtained by normalization, when normalization of inputted coordinate values to the effective grid is performed in a graphic form inputting or editing function; and second grid origin movement means, operable when the effective grid is changing to a new grid, for causing coordinate values of an origin of the new grid to coincide with coordinate values of the origin of the effective grid.

3. A graphic form inputting apparatus wherein one of a plurality of grids, selected by an operator to input or edit a graphic form, is displayed as an effective grid on a screen of a display apparatus, and wherein operator inputted coordinate values of said screen are normalized to coordinate values of the effective grid, comprising:

grid information storage means for storing grid information of individual attributes of the plurality of grids; and grid line distance changing means for (i) causing the operator to designate an arbitrary grid point on the effective grid as a first operation point, when the operator requests to chance distances between grid lines, (ii) displaying one of the other of the plurality of grids as a reference grid together with an origin of the effective grid and the first operation point in order to cause the operator to designate an arbitrary grid point on the reference grid as a second operation point, and (iii) changing distances between the grid lines of the effective grid so that the first operation point may correspond to the second operation point while the origin of the effective grid is left fixed as a reference.

4. A graphic form inputting apparatus wherein one of a plurality of grids, selected by an operator to input or edit a graphic forms, is displayed as an effective grid on a screen of a display apparatus, and wherein operator inputted coordinate values of said screen are normalized to coordinate values of the effective grid, comprising:

grid information storage means for storing grid information of individual attributes of the plurality of grids; and grid axis inclination angle changing means for (i) causing the operator to designate an arbitrary grid point on the effective grid as a first operation point when the operator requests to change distances between grid lines, (ii) displaying one of the other of the plurality of grids as a reference grid together with the origin of the effective grid and the first operation point, in order to cause the operator to designate an arbitrary grid point on the reference grid as a second operation point, and (iii) changing an inclination angle of a grid axis of the effective grid so that the first operation point may correspond to the second operation point while the origin of the effective grid is left fixed as a reference.

5. A method for inputting graphic forms on a screen, the method comprising the steps of:

inputting a first graphic form on the screen with reference to an effective grid displayed on said screen when an input graphic request is received;

receiving a request to display one of a plurality of grids as a reference grid;

displaying the reference grid;

receiving a request to move an origin of the effective grid;

receiving coordinate values corresponding to the reference grid, wherein said coordinate values are chosen to be a new origin of the effective grid;

changing the origin of the effective grid to the new origin;

displaying the effective grid; and inputting a second graphic form on the screen with reference to the effective grid when another input graphic request is received.

6. A method for inputting graphic forms as claimed in claim 5, further comprising the steps of:

normalizing coordinate values corresponding to the screen to coordinate values corresponding to one of the reference grid and the effective grid depending upon which of the reference grid and the effective grid are displayed.

7. A method for inputting graphic forms as claimed in claim 5, further comprising the steps of:

changing grid line distances of the effective grid by (i) defining a first operation point on the effective grid (ii) defining a second operation point on the reference grid, and (iii) changing the first operation point to the second operation point while maintaining a constant origin of the effective grid.

8. A method for inputting graphic forms as claimed in claim 5, further comprising the steps of:

changing axis inclination angles of the effective grid by (i) defining a first operation point on the effective grid (ii) defining a second operation point on the reference grid, and (iii) changing the first operation point to the second operation point while maintaining a constant origin of the effective grid.

* * * * *